(12) United States Patent
Lee et al.

(10) Patent No.: US 12,201,895 B2
(45) Date of Patent: *Jan. 21, 2025

(54) GAMING CONTROLLER FOR MOBILE DEVICE AND METHOD OF OPERATING A GAMING CONTROLLER

(71) Applicant: Razer (Asia-Pacific) Pte. Ltd., Singapore (SG)

(72) Inventors: Kah Yong Lee, Singapore (SG); Chee Oei Chan, Singapore (SG); Ann Tiong Ong, Singapore (SG); Yifeng Chen, Singapore (SG); Stuart Wells, San Francisco, CA (US)

(73) Assignee: Razer (Asia-Pacific) Pte. Ltd., Singapore (SG)

( * ) Notice: Subject to any disclaimer, the term of this patent is extended or adjusted under 35 U.S.C. 154(b) by 33 days.

This patent is subject to a terminal disclaimer.

(21) Appl. No.: 18/106,954

(22) Filed: Feb. 7, 2023

(65) Prior Publication Data

US 2023/0285848 A1 Sep. 14, 2023

Related U.S. Application Data

(63) Continuation of application No. 17/336,049, filed on Jun. 1, 2021, now Pat. No. 11,607,608, which is a
(Continued)

(51) Int. Cl.
*A63F 13/235* (2014.01)
*A63F 13/22* (2014.01)
(Continued)

(52) U.S. Cl.
CPC ............ *A63F 13/235* (2014.09); *A63F 13/22* (2014.09); *A63F 13/23* (2014.09); *A63F 13/24* (2014.09);
(Continued)

(58) Field of Classification Search
None
See application file for complete search history.

(56) References Cited

U.S. PATENT DOCUMENTS

| 6,530,838 B2 | 3/2003 | Ha et al. |
| 7,235,738 B2 | 6/2007 | Horinouchi et al. |

(Continued)

FOREIGN PATENT DOCUMENTS

| CN | 203169986 U | 9/2013 |
| CN | 103381299 A | 11/2013 |

(Continued)

OTHER PUBLICATIONS

Office Action issued on Apr. 27, 2023 for Taiwan Application No. 111134024 and its English translation (20 pages).
(Continued)

*Primary Examiner* — Ronald Laneau
(74) *Attorney, Agent, or Firm* — Polsinelli PC

(57) ABSTRACT

According to various embodiments, a gaming controller for a mobile device includes a first hardware gaming controller configured to be manipulated by a user's left thumb and/or fingers to generate a left controller input; and a second hardware gaming controller configured to be manipulated by a user's right thumb and/or fingers to generate a right controller input. The first hardware gaming controller is mechanically securable to a side portion of a housing, and the second hardware gaming controller is mechanically securable to an opposing side portion of the housing. One of the first hardware gaming controller and the second hardware gaming controller is a primary game controller configured to combine the left controller input and the right controller input into a single controller input representation for providing to the mobile device.

20 Claims, 22 Drawing Sheets

Related U.S. Application Data continuation of application No. 16/586,873, filed on Sep. 27, 2019, now Pat. No. 11,045,723, which is a continuation-in-part of application No. 16/293,609, filed on Mar. 5, 2019, now Pat. No. 10,716,998, which is a continuation of application No. 15/527,801, filed as application No. PCT/SG2014/000545 on Nov. 18, 2014, now Pat. No. 10,258,876.

(51) Int. Cl.
A63F 13/23 (2014.01)
A63F 13/24 (2014.01)
A63F 13/92 (2014.01)

(52) U.S. Cl.
CPC ........ A63F 13/92 (2014.09); A63F 2300/209 (2013.01)

(56) References Cited

U.S. PATENT DOCUMENTS

| | | |
|---|---|---|
| 7,580,728 B2 | 8/2009 | Vance et al. |
| 7,833,097 B1 | 11/2010 | Maddox et al. |
| 8,200,795 B2 | 6/2012 | Patil |
| 8,529,357 B2 | 9/2013 | Joynes et al. |
| 8,738,783 B2 | 5/2014 | Bathiche et al. |
| 8,788,348 B2 | 7/2014 | Joynes et al. |
| 8,810,536 B2 | 8/2014 | McDermid |
| 8,812,987 B2 | 8/2014 | Joynes et al. |
| 8,858,335 B2 | 10/2014 | Helmes et al. |
| 8,939,838 B2 | 1/2015 | Alten et al. |
| 8,944,912 B2 | 2/2015 | Joynes et al. |
| 8,944,913 B2 | 2/2015 | Joynes et al. |
| 9,005,025 B2 | 4/2015 | Joynes et al. |
| 9,005,026 B2 | 4/2015 | Joynes et al. |
| 9,081,545 B1 | 7/2015 | Lin et al. |
| 9,114,319 B2 | 8/2015 | Joynes et al. |
| 9,126,119 B2 | 9/2015 | Joynes et al. |
| 9,138,640 B2 | 9/2015 | Baum et al. |
| 9,216,349 B2 | 12/2015 | South |
| 9,246,999 B2 | 1/2016 | Milburn et al. |
| 9,281,859 B1 | 3/2016 | Lee |
| 9,407,100 B2 | 8/2016 | Joynes et al. |
| 9,539,507 B2 | 1/2017 | Schoenith et al. |
| 9,592,452 B2 | 3/2017 | Townley et al. |
| 9,592,453 B2 | 3/2017 | Townley et al. |
| 9,757,649 B2 | 9/2017 | Townley et al. |
| 9,764,231 B2 | 9/2017 | Townley et al. |
| 9,776,081 B2 | 10/2017 | Fujita et al. |
| 9,808,713 B1 | 11/2017 | Townley et al. |
| 9,839,842 B2 | 12/2017 | Townley et al. |
| 9,841,786 B2 | 12/2017 | Townley et al. |
| 9,841,824 B2 | 12/2017 | Townley et al. |
| 9,855,498 B2 | 1/2018 | Townley et al. |
| 9,895,606 B1 | 2/2018 | Kamata et al. |
| 9,996,107 B2 | 6/2018 | Inoue et al. |
| 10,010,789 B2 | 7/2018 | Koizumi et al. |
| 10,068,417 B2 | 9/2018 | Toohey et al. |
| 10,074,269 B2 | 9/2018 | Oizumi et al. |
| 10,092,829 B2 | 10/2018 | Ikuta et al. |
| 10,092,830 B2 | 10/2018 | Townley et al. |
| 10,118,093 B2 | 11/2018 | Koizumi et al. |
| 10,118,102 B2 | 11/2018 | Kyuma |
| 10,143,917 B2 | 12/2018 | Oizumi et al. |
| 10,258,876 B2 * | 4/2019 | Wells .................. A63F 13/22 |
| D937,933 S | 12/2021 | Tong |
| 2007/0293318 A1 | 12/2007 | Tetterington et al. |
| 2008/0064498 A1 | 3/2008 | Okamura |
| 2009/0054146 A1 | 2/2009 | Epstein et al. |
| 2009/0291760 A1 | 11/2009 | Hepburn et al. |
| 2010/0216551 A1 | 8/2010 | Dwyer et al. |
| 2010/0248838 A1 | 9/2010 | Miyaji et al. |
| 2011/0260969 A1 | 10/2011 | Workman |
| 2011/0312417 A1 | 12/2011 | MacKay |
| 2012/0034978 A1 | 2/2012 | Lim |
| 2012/0220372 A1 | 8/2012 | Cheung et al. |
| 2013/0095925 A1 | 4/2013 | Xu |
| 2013/0184077 A1 | 7/2013 | Galpern |
| 2013/0267322 A1 | 10/2013 | South |
| 2013/0296048 A1 | 11/2013 | Jeffrey et al. |
| 2014/0040765 A1 | 2/2014 | Fung et al. |
| 2014/0043277 A1 | 2/2014 | Saukko et al. |
| 2014/0179437 A1 | 6/2014 | King et al. |
| 2014/0221098 A1 | 8/2014 | Boulanger |
| 2014/0267013 A1 | 9/2014 | Grant et al. |
| 2014/0309038 A1 | 10/2014 | Patil |
| 2015/0018101 A1 | 1/2015 | Schoenith et al. |
| 2015/0281422 A1 | 10/2015 | Kessler et al. |
| 2016/0107082 A1 | 4/2016 | Song et al. |
| 2016/0361640 A1 | 12/2016 | Iwao et al. |
| 2016/0361641 A1 | 12/2016 | Koizumi et al. |
| 2017/0056762 A1 | 3/2017 | Gafni |
| 2017/0206804 A1 | 7/2017 | Roszyk et al. |
| 2017/0348592 A1 | 12/2017 | Tanaka |
| 2018/0036642 A1 | 2/2018 | Tanaka et al. |
| 2018/0065035 A1 | 3/2018 | Yamazaki |
| 2018/0178114 A1 | 6/2018 | Mizuta et al. |
| 2018/0178118 A1 | 6/2018 | Kyuma |
| 2018/0178120 A1 | 6/2018 | Kyuma |
| 2018/0178121 A1 | 6/2018 | Yamashita et al. |
| 2018/0185752 A1 | 7/2018 | Kakinuma et al. |
| 2018/0193730 A1 | 7/2018 | Oizumi et al. |
| 2018/0193732 A1 | 7/2018 | Kamata et al. |
| 2018/0193734 A1 | 7/2018 | Gohara |
| 2018/0193736 A1 | 7/2018 | Gohara |
| 2018/0193743 A1 | 7/2018 | Kitazono et al. |
| 2018/0193757 A1 | 7/2018 | Kyuma |
| 2018/0200620 A1 | 7/2018 | Yamashita et al. |
| 2018/0345130 A1 * | 12/2018 | Wells .................. A63F 13/92 |
| 2018/0369692 A1 * | 12/2018 | Winick ................ A63F 13/355 |
| 2019/0001233 A1 | 1/2019 | Terui et al. |
| 2019/0015744 A1 | 1/2019 | Ueda et al. |
| 2019/0022522 A1 | 1/2019 | Croft |
| 2019/0030423 A1 * | 1/2019 | Onozawa ................ A63F 13/98 |
| 2019/0107980 A1 | 4/2019 | Chang et al. |

FOREIGN PATENT DOCUMENTS

| | | |
|---|---|---|
| CN | 107911511 A | 4/2018 |
| CN | 107961532 A | 4/2018 |
| CN | 207612285 U | 7/2018 |
| CN | 207612322 U | 7/2018 |
| CN | 207694238 U | 8/2018 |
| CN | 207706255 U | 8/2018 |
| KR | 20130070773 A | 6/2013 |
| TW | 417123 B | 1/2001 |
| TW | 201019172 A | 5/2010 |
| TW | M477970 U | 5/2014 |
| TW | M488335 U | 10/2014 |
| WO | 2004007041 A2 | 1/2004 |
| WO | 2016080906 A1 | 5/2016 |
| WO | 2017088739 A1 | 6/2017 |

OTHER PUBLICATIONS

European Extended Search Report mailed May 7, 2018 for the corresponding European Patent Application No. 14906245.7 (9 pages).

Bounabay Wireless Telescopic Bluetooth Controller Gamepad for Android iOS System (https://www.amazon.com/Bounabay-Wireless_telescopic-Bluetooth-Controller/dp/B06XKSNCTM) (10 pages).

Nintendo Joy-Con (L/R)—Gray by Nintendo (https://www.amazon.com/Nintendo-Joy-L-R-Gray-swtich/dp/B01N6OKT7H?th=1) (8 pages).

Wee2T bluethooth Wireless Flashplay 6-axis Adjustable Gamepad Game Controller (https://www.fllydigi.com/endown/online/wee2) (6 pages).

English Translation of Office Action mailed Aug. 31, 2021 in Taiwanese Patent Application No. 108148102 (15 pages).

* cited by examiner

GAMING CONTROLLER FOR MOBILE DEVICE AND METHOD OF OPERATING A GAMING CONTROLLER

CROSS-REFERENCE TO RELATED APPLICATIONS

This application is a continuation of U.S. patent application Ser. No. 17/336,049 filed Jun. 1, 2021, which is a continuation of U.S. patent application Ser. No. 16/586,873 filed Sep. 27, 2019, now U.S. Pat. No. 11,045,723, which is a continuation-in-part of U.S. patent application Ser. No. 16/293,609 filed Mar. 5, 2019, now U.S. Pat. No. 10,716,998, which is a continuation of U.S. patent application Ser. No. 15/527,801 filed May 18, 2017, now U.S. Pat. No. 10,258,876, which is a National Phase Application under 35 U.S.C. § 371 of PCT/SG2014/000545, filed on Nov. 18, 2014, which published as WO 2016/080906 on May 26, 2016, the contents of each are incorporated herein by reference to their entirety.

TECHNICAL FIELD

The present disclosure describes embodiments generally related to a gaming controller for a mobile device. Further, embodiments can relate to a method of operating a gaming controller.

BACKGROUND

Mobile devices are ubiquitous today's society and provide generally immediate access to communication, entertainment, and navigation as well as provide a seemingly endless array of solutions to problems that users sometimes do not even know exist. With the introduction of high-performance processors, graphics modules and high resolution displays into the hardware of mobile devices, mobile devices are now able to access and operate a plethora of resource hungry applications, for example, computer gaming applications.

Previously, mobile gaming was carried out with dedicated mobile gaming devices, which can typically include a device body with a display screen and controller buttons or joysticks provided on the device body. In comparison, complex computer games in various genres can now be operated on multi-functional mobile devices such as mobile phones and mobile tablet computers. However, there is a dissatisfaction in gaming on such multi-functional mobile devices, for which the primary function still remains as for communication, or for entertainment in watching a video or reading an article. This is due to the lack of hardware gaming controller features provided with the multi-functional mobile devices for physical user manipulation, which reduces the type and amount of user input into the gaming application as well as depreciates the gaming experience. Further, most personal computer (PC) based games which can now run on mobile devices require more input that what the touch-based display of mobile devices usually provide for.

In response to such a need, various manufacturers have provided hardware gaming controllers for connecting to a mobile device, typically a multi-functional mobile device. For example, a console gaming controller can be plugged into a mobile device through a universal serial bus (USB) connection, or can operate uncoupled from the mobile device through a wireless Bluetooth® connection. However, such separate gaming controllers take away from the mobility and portability of mobile devices, and handling the mobile device separate from the gaming controller is not desirable.

The proprietor of the present disclosure has previously released a gamepad controller peripheral, the Razer® Edge® Gaming Controller, which can receive a mobile tablet computer into a device body, and includes a pair of handles on both sides of the body, each handle including a joystick and controller buttons. The mobile computer is thus physically transformed to a dedicated gaming device, capable of being physically handled and providing hardware control elements for user manipulation.

However, a mobile device, in adapting such a gamepad controller peripheral for dedicated mobile gaming, becomes relatively heavy and bulky, which can be detrimental to a gamer operating such a device.

An alternative solution is thus sought in providing hardware gaming controllers for use with a mobile device with for gaming applications, to provide for a fuller gaming experience, and in which any impairment of the portability or handling of the mobile device is reduced.

SUMMARY

According to an embodiment, there is provided a gaming controller for a mobile device, including: a first hardware gaming controller including a first programmable controller and at least one input switch, the at least one input switch of the first hardware gaming controller configured to be manipulated by a user's left thumb and/or fingers to generate a left controller input with the first programmable controller; and a second hardware gaming controller including a second programmable controller and at least one input switch, the at least one input switch of the second hardware gaming controller configured to be manipulated by a user's right thumb and/or fingers to generate a right controller input with the second programmable controller; the first hardware gaming controller and the second hardware gaming controller each configured to be removably coupleable with a mobile device, the mobile device including a housing, and a mobile device processor coupled to a memory module and provided with the housing, the mobile device processor configured to run a software application; wherein the first hardware gaming controller is configured to be mechanically secured to a side portion of the housing of the mobile device, and the second hardware gaming controller is configured to be mechanically secured to an opposing side portion of the housing of the mobile device; and wherein the left controller input and the right controller input are combined with a virtual controller module to form a virtual gaming controller with a single controller input representation for providing to the software application.

According to an embodiment, there is provided a method of operating a gaming controller, the gaming controller including a first hardware gaming controller and a second hardware gaming controller each configured to be removably coupleable with a mobile device, the first hardware gaming controller configured to be mechanically secured to a side portion of a housing of the mobile device, and the second hardware gaming controller configured to be mechanically secured to an opposing side portion of the housing of the mobile device, the method including: generating a left controller input with a first programmable controller in the first hardware gaming controller, the first hardware gaming controller configured to be manipulated by a user's left thumb and/or fingers; generating a right controller input with a second programmable controller in the second hardware gaming controller, the second hardware gaming controller configured to be manipulated by a user's right thumb and/or fingers; combining the left controller input and the right controller input to form a virtual gaming controller with a single controller input representation; and providing the virtual gaming controller to a software application operating on a mobile device processor in the mobile device.

According to an embodiment, there is provided a gaming controller for a mobile device. The gaming controller may include a first hardware gaming controller configured to be manipulated by a user's left thumb and/or fingers to generate a left controller input; and a second hardware gaming controller configured to be manipulated by a user's right thumb and/or fingers to generate a right controller input. The first hardware gaming controller may be mechanically securable to a side portion of a housing, and the second hardware gaming controller may be mechanically securable to an opposing side portion of the housing. One of the first hardware gaming controller and the second hardware gaming controller may be a primary game controller configured to combine the left controller input and the right controller input into a single controller input representation for providing to the mobile device.

According to an embodiment, there is provided a method of operating a gaming controller. The gaming controller may include a pair of hardware controllers. The method may include: configuring one hardware controller of the pair of hardware controllers to operate as a primary game controller; configuring the other hardware controller of the pair of hardware controllers to operate as a secondary game controller; receiving in the primary game controller, a controller input of the secondary game controller; combining, by the primary game controller, a controller input of the primary game controller and the received controller input of the secondary game controller into a single controller input representation; and transmitting, by the primary game controller, the single controller input representation to a mobile device.

BRIEF DESCRIPTION OF THE DRAWINGS

In the drawings, like reference characters generally refer to the same parts throughout the different views. The drawings are not necessarily to scale, with emphasis instead generally being placed upon illustrating the principles of the present disclosure. It is to be noted that the accompanying drawings illustrate only examples of embodiments of this disclosure and are therefore not to be considered limiting of its scope, for the disclosure may admit to other equally effective embodiments. In the following description, various embodiments of the disclosure are described with reference to the following drawings, in which.

DETAILED DESCRIPTION

Figure 1A:
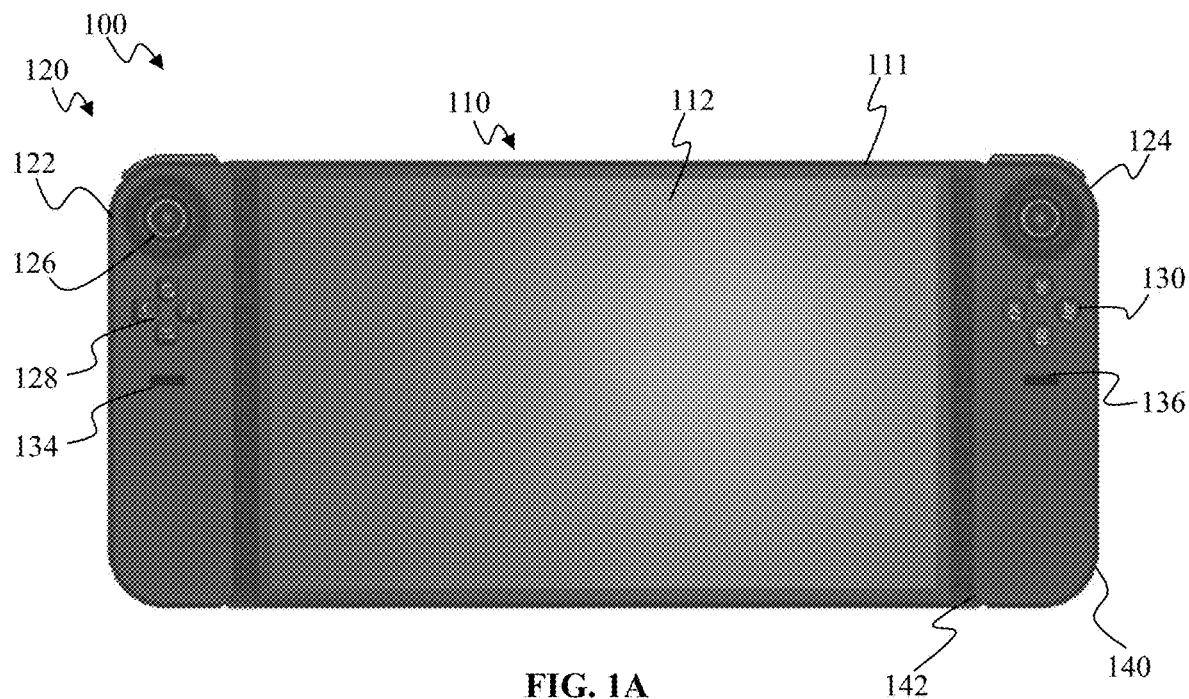
FIG. 1A illustrates a mobile gaming device according to an embodiment of the present disclosure.

Embodiments of a gaming controller for a mobile gaming device, a virtual gaming controller and a method of operating a gaming controller are described in detail below with reference to the accompanying figures. However, it should be understood that the disclosure is not limited to specific described embodiments. It will be appreciated that the embodiments described below can be modified in various aspects, features, and elements, without changing the essence of the disclosure. Further, any reference to various embodiments shall not be construed as a generalization of any inventive subject matter disclosed herein and shall not be considered to be an element or limitation of the appended claims except where explicitly recited in a claim(s).

According to various embodiments, depiction of a given element or consideration or use of a particular element number in a particular FIG. or a reference thereto in corresponding descriptive material can encompass the same, an equivalent, or an analogous element or element number identified in another FIG. or descriptive material associated therewith. The use of "/" herein means "and/or" unless specifically indicated otherwise.

The present disclosure can describe embodiments of a consumer electronic device which can be operable in various orientations, and it thus should be understood that any of the terms "top", "bottom", "base", "down", "sideways", "downwards" etc., when used in the following description are used for convenience and to aid understanding of relative positions or directions, and not intended to limit the orientation of the recording medium or a system or apparatus or product incorporating the recording medium.

A computing system or a controller or a microcontroller or any other system providing a processing capability can be presented according to various embodiments in the present disclosure. Such a system can be taken to include a processor. A device or system according to the present disclosure can include a memory which is for example used in the processing carried out by the device or system. A memory used in the embodiments may be a volatile memory, for example a DRAM (Dynamic Random Access Memory) or a non-volatile memory, for example a PROM (Programmable Read Only Memory), an EPROM (Erasable PROM), EEPROM (Electrically Erasable PROM), or a flash memory, e.g., a floating gate memory, a charge trapping memory, an MRAM (Magnetoresistive Random Access Memory) or a PCRAM (Phase Change Random Access Memory).

In various embodiments, a "circuit" may be understood as any kind of a logic implementing entity, which may be special purpose circuitry or a processor executing software stored in a memory, firmware, or any combination thereof. Thus, in an embodiment, a "circuit" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "circuit" may also be a processor executing software, e.g. any kind of computer program, e.g. a computer program using a virtual machine code such as e.g. Java. Any other kind of implementation of the respective functions which will be described in more detail below may also be understood as a "circuit" in accordance with various alternative embodiments. Similarly, a "module" is thusly defined as a portion of a system according to the present disclosure and may encompass a "circuit" as above, or may be understood to be any kind of a logic-implementing entity therefrom.

In the specification, the term "comprising" shall be understood to have a broad meaning similar to the term "including" and will be understood to imply the inclusion of a stated feature or step or group of features or steps but not the exclusion of any other feature or step or group of features or steps. This definition also applies to variations on the term "comprising" such as "comprise" and "comprises".

The reference to any prior art in this specification is not, and should not be taken as an acknowledgement or any form of suggestion that any referenced prior art forms part of the common general knowledge.

FIG. 1A illustrates a mobile gaming device according to an embodiment of the present disclosure. Mobile gaming device 100 is shown, and for clarification, can be understood to be a mobile device for gaming and capable of operating as a mobile gaming device. Mobile gaming device 100 can include a mobile device 110. The mobile device 110 or mobile computer or mobile computing device can be a mobile tablet computer, including a housing 111, the housing 111 including or housing a display screen 112 and a hardware processing system (not shown) including various circuitry and semi-conductor based components and electronics, for operating a mobile computing device. The mobile device 110 can be operated independently from the mobile gaming device 100 or can be integrated as one with the mobile gaming device 100. The display screen 112 can be a touch-enabled screen, allowing for user interaction through the screen. The mobile gaming device 100 further includes a pair of controllers 120 coupled to the mobile device 100.

As mentioned above, a solution is desired, in which a mobile device is provided with hardware controllers for gaming applications, which any impairment of the portability or handling of the mobile device is reduced. In coming up with such a gaming controller peripheral solution, the present inventors came across a need to break a single game controller into a plurality of devices. For example, hardware components for the left side of the controller had to be separated from the hardware components for the right side of the controller.

Typically, game controllers connect to a computer or game console though a cable using a USB protocol, or wirelessly with the Bluetooth® protocol. The available buttons and axis controllers are defined using the USB human control interface device class transport protocol (HID). The HID transport protocol has been adapted to other protocols, such as Bluetooth, to describe when a button has been pressed or a joystick has been moved. The HID protocol defines the capabilities of the game controller attaching to the computer through an HID descriptor, while changes in state of buttons and joysticks are represented through HID reports. The operating system of a computer or mobile device, such as Linux®, Android™ and Windows, process HID descriptors and reports to create a one-to-one mapping of devices and interfaces, so a game application sees the input of every attached device in making use of them.

However, most game applications assume that there is a single HID interface for a game controller, and are written as such. As such, to break a game controller into a plurality of devices leads to where game applications have to be re-written for proper operation, for example to receive a HID input from a left-side controller and a HID input from a right-side controller. This would be counter-intuitive, and limit any benefit in providing a game controller peripheral in which any impairment of the portability or handling of the mobile device is reduced.

Various embodiments of the present disclosure seek to provide a virtual gaming controller with a single controller input representation formed from combining separate inputs from the plurality of devices broken down from a typical game controller. Such a virtual gaming controller is thereafter provided to the software gaming application in representation of a user's input through the plurality of devices broken down from a typical game controller.

According to various embodiments of the present disclosure, a pair of controllers 120, including a first left-side controller 122 and a second right-side controller 124, are provided, for removably coupling to a mobile device 110. The first controller 122 and the second controller 124 can be provided on opposing sides of the display screen 112 of the mobile device 110. The first controller 122 and the second controller 124 can be removably coupled to the mobile device 110. Such a coupling includes a physical mechanical coupling, as well a data communication coupling between the gaming controllers 120 and the mobile device 100. The mechanical coupling between the controller and the mobile device 110 is configured to secure the controller adjacent to the mobile device 110, such that controller maintains a firm connection with the mobile device 110 during use.

A snap-on interface can be provided between a controller 120 and the mobile device 110, where the controller 120 is securely but removably fastened onto the mobile device 110. In embodiments, the physical coupling of the controllers 120 to the mobile device 110 can be with a magnetic coupling. In embodiments, the housing of controller 120 and mobile device 110 can be correspondingly molded to provide for a better fit, as well as to provide a good secure grip in handling for a user. In embodiments, the physical coupling includes a USB port connection. The controllers 120 can each include a male USB plug which is arranged to mate with a female USB port or socket on the mobile device 110. The USB connection can be carried out with any connection or at any speed in association with a USB connection. Such a serial USB connection can also provide for a data communication connection between the controllers 120 and the mobile device 110. In embodiments, the controller 120 and mobile device 110 include a data communication coupling which can be a wireless data communication coupling. The wireless data communication coupling can be any one of a Bluetooth® connection, a Wireless Universal Serial Bus (WUSB) connection, a radio frequency connection, or an infrared data connection.

It is noted that the first controller 122 and the second controller 124 are provided as separate entities, and are coupled to either side of the mobile device 110. In such a way, the first controller 122 and the second controller 124 include separate electronics or components with each controller for the independent operation of each controller as a gaming controller, even though the first controller 122 and the second controller 124 are provided for a single-side input from a user for a gaming application. In an embodiment, the first controller 122 includes a first programmable controller, and the second controller 124 includes a second programmable controller. This is in comparison to typical gaming controllers, provided in a single device, where left-side input is coupled to right-side input, and processed with a single set of electronics or components. In various embodiments, the first controller and the second controller are provided as a singular gaming controller peripheral, physically connected by perhaps a receiving plate, the gaming controller peripheral arranged to receive a mobile device. Such an arrangement can be provided for additional support in receiving the mobile device, or in providing an additional battery back for extended operation of the mobile gaming device. However, the first controller and the second controller can still remain as separate operating entities, each configured to send controller input independently to the mobile computing device.

In an embodiment, the first controller and the second controller are permanently coupled onto the mobile device in forming the mobile gaming device. In such an embodiment, the first controller and the second controller can still each include electronics and components and are arranged to function independently of each other. In an embodiment, the first controller and the second controller are provided for operation independent physically from the mobile device. A user can activate the first controller and second controller, which can be the left half and the right half of a gaming controller, and wireless communication can be utilized for operation as according to embodiments of the present disclosure.

Controllers 120 can each include one or more input switches for user manipulation, for example, a joystick controller 126, and a set of gaming control buttons 128. Any number of gaming control buttons can be provided in the set, which can differ in number and configuration between the set on the left controller 122 and the set on the right controller 124. For example, the left controller 122 can include a set of gaming control buttons 128 which can include four buttons set out in a directional pad configuration, while the right controller 124 can include a set of gaming control buttons 130 which can include a plurality of action control buttons. Further, additional shoulder buttons 132 can be provided at an edge of the controllers 120 corresponding to a top side of the mobile device 110. The shoulder buttons 132 are arranged to be operated by an index finger, and can include multiple shoulder buttons on each controller 120. Input switches on the left controller 122 can be configured to be manipulated by a user's left thumb and/or fingers to generate a left controller input, while input switches on the right controller 124 can be configured to be manipulated by a user's right thumb and/or fingers to generate a right controller input.

Controllers 120 can include an indicator 134 provided on a front surface of the controller 120. The indicator 134 can include a light-emitting diode (LED) which can provide an indication to a user. For example, the LED indicator can indicate status of the controller, i.e. activation or operation of the controllers, or can indicate that a wireless coupling is established between the controller 120 and the mobile device, or can be for a battery indication function. In embodiments, the indicator 134 can include a number of differently-colored LEDs, which can thereafter provide various kinds of notifications, through lighting up, or intervallic blinking of the LEDs.

Controllers 120 can further include an elongate horizontal button 136 provided under the gaming control buttons 128. The horizontal button 136 can be provided for various gaming functions, for example, for a pause function, or a select function, or any other appropriate function. Other buttons or functions can be provided on one or both controllers in various other embodiments.

Figure 1B:
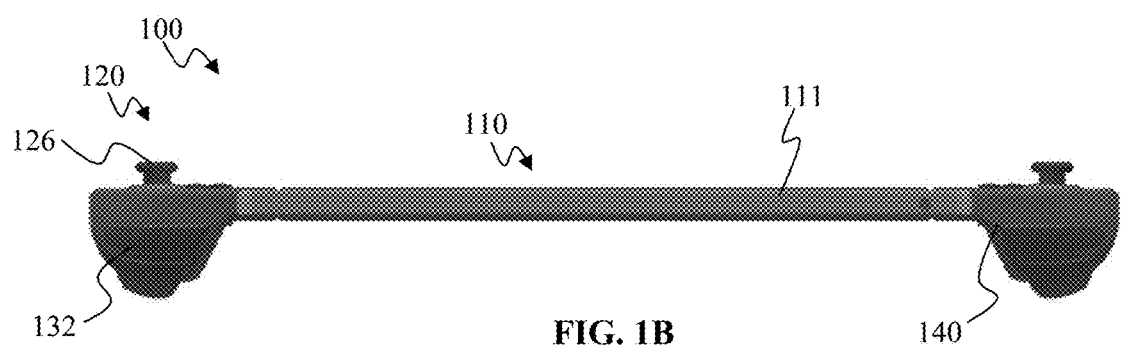
FIG. 1B illustrates a side profile of the mobile gaming device of FIG. 1A.

FIG. 1B illustrates a side profile of the mobile gaming device 100 of FIG. 1A. FIG. 1B can be a top-down view from the direction indicated by A in FIG. 1A. Each of the controller 120 can be provided with a joystick 126 and shoulder buttons 132 for manipulation by a user. Further, FIG. 1B highlights the slim form factor of the mobile gaming device 100, which does not introduce noticeable girth to the thickness of the mobile device 110, in providing a hardware gaming controller 120 for gaming applications.

Controllers 120 can each be provided with a body 140 with a dimension of one of its sides 142 substantially similar to the breadth of the mobile device 110, and arranged to be coupled to one of both sides of the mobile device. The body 140 can thus provide a physical extension of the mobile device 120, which can be used for handling and manipulated by the user. Further, the body 140 can be ergonomically designed and formed, and arranged to provide a comfortable grip by a user's hand in engaging with the mobile gaming device 100. It can be observed that the left controller 122 is provided separately from the right controller 124 and each includes an individual coupling to or with the mobile device 110.

Figure 2A:
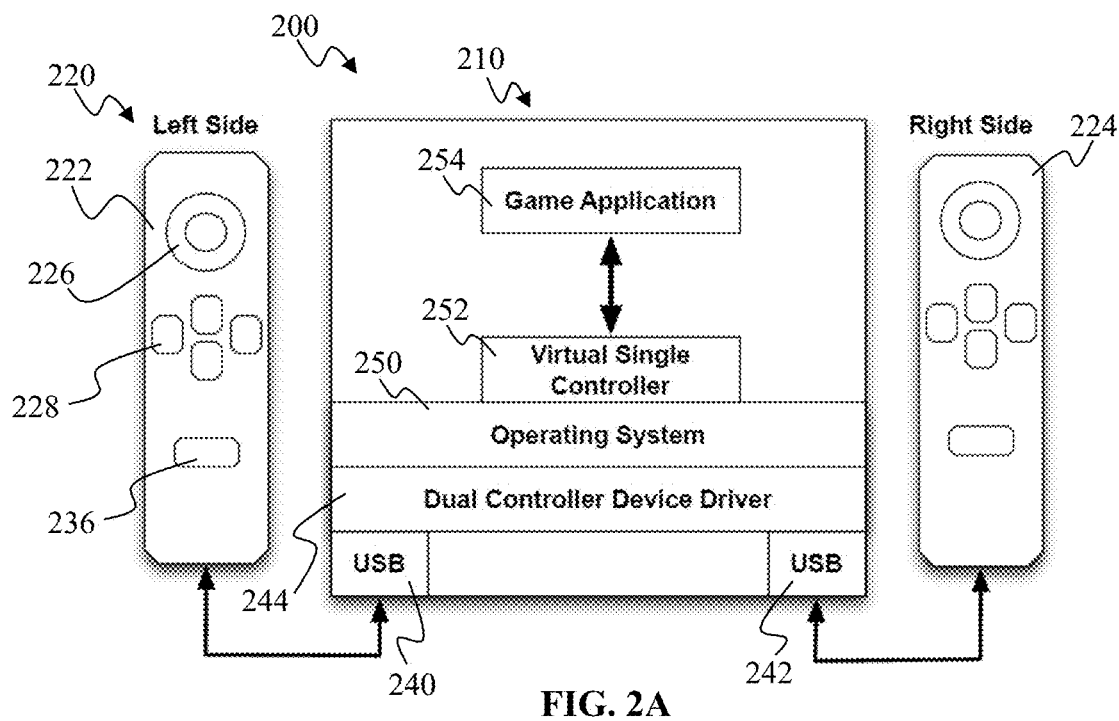
FIG. 2A illustrates a schematic representation of a mobile gaming device according to an embodiment.

FIG. 2A illustrates a schematic representation of a mobile gaming device 200 according to an embodiment. Controllers 220 are provided for a mobile device 210. First left-side hardware controller 222 and second right-side hardware controller 224 are provided and arranged for coupling with the mobile device 210. The gaming controllers 220 can include a variety of hardware controller buttons, for example, joystick 226, gaming control buttons 228 and horizontal button 236. Other buttons or functionality can be included, where needed.

Mobile device 210 can include a mobile processor (not shown) and a memory module (not shown) which allow the function of the mobile device 210 as a computing device. Various other electronics, components, circuits and modules can run on the mobile device 210, with or without coupling to the mobile processor or the memory module. Mobile device 210 can include a USB port. In embodiments, two USB ports are provided, a left USB port 240 for coupling with the left controller 222 and a right USB port 242 for coupling with the right controller 224. The USB ports 240, 242 can be a USB socket arranged to receive a USB plug on the controllers 220 to form a USB coupling. The USB coupling can be a micro-USB coupling operating under the USB 3.0 protocol, but other USB couplings or other comparable couplings can be utilized.

Left controller 222 and right controller 224 can include sufficient hardware and programmable components to each function as a standalone controller. Left controller 222 and right controller 224 can receive user manipulation or control and in response generate control data which can be according to HID protocol. Left controller 222 and right controller 224 can generate a HID input, such as a plurality of HID descriptors and reports in accordance to user input or manipulation of the joystick 226 or gaming control buttons 228 of the controllers 220, and subsequently provide the HID input to the mobile device 210 for processing and entry for use in for example, a software gaming application. The USB couplings formed by connection between the mobile device 210 and the left controller 222 and the right controller 224 and the left USB port 240 and the right USB port 242 can thus be a HID coupling. In various embodiments, a plurality of HID interfaces are provided for a plurality of game controllers coupled to the mobile device in a mobile gaming device.

Mobile device 210 can further include a device driver 244. In embodiments, the device driver 244 can be a controller device driver, arranged to receive HID input from a hardware controller operating under the HID protocol and interpreting the HID input for further processing. In embodiments, the device driver 244 can be a dual controller device driver, arranged to receive HID input from two hardware controllers and interpreting the HID input from the two hardware controllers for further processing. Device driver 244 can be coupled to left USB port 240 and right USB port 242, and receive information from left controller 222 and right controller 224 through the left USB port 240 and right USB port 242 respectively. Device driver 244 can identify when HID input is generated and made available by the controllers 220, and thereafter receives, translates and delivers the translated information to the operating system for consumption. Device driver 244 can be a computer program operating in a kernel on the mobile processor and memory module of the mobile device 210, and can communicate with the coupled controllers 220 through an established HID interface. Device driver 244 can be dependent on the hardware of the controllers 220 and the mobile device 210, as well as dependent on the kind operating system run by the mobile device 210, and acts as a type of translator between the controllers 220 and the mobile device 210.

Device driver 244 communicates with an operating system program 250 running on the mobile device 210, supported by the mobile device processor and memory module. The operating system 250 generally manages the hardware and software components of the mobile device, and provides and functions as an interface between the device and a user. The operating system 250 can operate various kinds of software applications for the mobile device, for example word processing, internet browsing, music, movies, gaming, etc., which can run on the operating system 250 as dedicated standalone applications. In embodiments, the operating system 250 of the mobile device 210 is an Android operating system for mobile devices, but other operating systems such as Linux or Windows or iOS can be suitable as well.

Mobile device 210 further includes a virtual controller module 252. Virtual controller module 252 can operate on the processor of the mobile device, for example in the operating system 250, and is arranged to receive a HID input from the gaming controllers 220. Such HID input can be translated by the device driver 244 prior to being received by the operating system 250 and the virtual controller module 252. The virtual controller module 252 is configured to receive HID input, such as a left controller input from the left controller 222 and a right controller input from the right controller 224. The virtual controller module 252 is further configured to combine both the left controller input and the right controller input to form a single controller input representation that contains all the elements of a combined controller. As such, even though the left controller 222 and the right controller 224 are provided as separate entities with separate hardware and programmable parts, the input from both the left controller 222 and the right controller 224 are both amalgamated in the coupled mobile device for operation as though the left controller and the right controller form part of the same controller, through the virtual controller module 252. Such a single controller representation is then passed on to a game application 254 running on the mobile device 210.

Figure 2B:
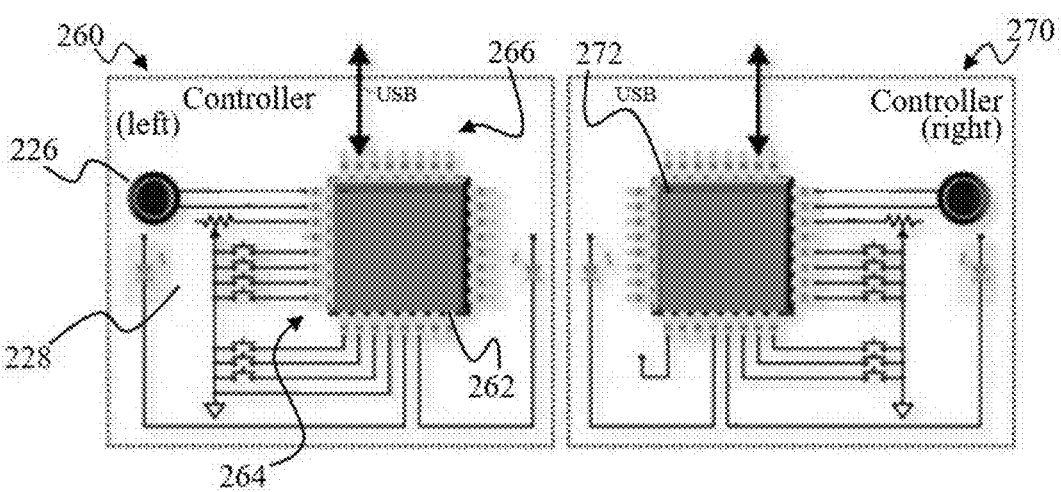
FIG. 2B illustrates a circuit schematic of the hardware gaming controllers of FIG. 2A.

FIG. 2B illustrates a circuit schematic of the hardware gaming controllers of FIG. 2A. Circuit 260 provides a representation of the hardware component connections in relation to left gaming controller 222. A programmable controller 262 can be provided in the left gaming controller 222, arranged to carry out functionality relating to operating a gaming controller. The programmable controller 262 can be an integrated circuit, or a microcontroller, or a microprocessor, provided as a semiconductor device for operation. The controller 262 can include a small processor for carrying out various functionalities. The controller 262 can be arranged to receive a plurality of inputs and generate a plurality of outputs. A plurality of general purpose input/output (GPIO) pins 264 can be provided, to provide communication with various components. For example, a set of pins are configured to communicate with joystick 226 and gaming control buttons 228, to receive input from these controls. Further, output pins can be coupled to one or more LED indicators for controlling the LEDs. In addition, the gaming controller can also include a vibration module, to provide vibration feedback for a user.

In addition, a set of pins 266 are arranged to be dedicated for USB communication, and can be coupled to a USB plug provided on the left gaming controller 222, for carrying out a USB coupling with the mobile device 210. Pins 266 can carry an amount of information for providing to the device driver. In embodiments, controller 262 can include an analog-to-digital converter function in addition to a programming execution function. In such a way, input received from gaming controls such as the joystick 226 and gaming control buttons 228 can be received as analog input by the controller 262, and thereafter converted to digital data, which can then be rearranged for output as HID information, for example containing HID descriptors and reports. The circuit 260 and controller 262 can further be arranged for additional functionality if the need so requires.

Circuit 270 provides a representation of the hardware component connections in relation to right gaming controller 224. A programmable controller 272 can be provided in the right gaming controller 224, arranged to carry out functionality relating to operating a gaming controller. In an embodiment, the left gaming controller 222 is equivalent to the right gaming controller 224, except operating for receiving input from different sides for a user. As such, the circuit 260 for the left gaming controller 222 is equivalent to the circuit 270 for the right gaming controller 224.

Figure 3:
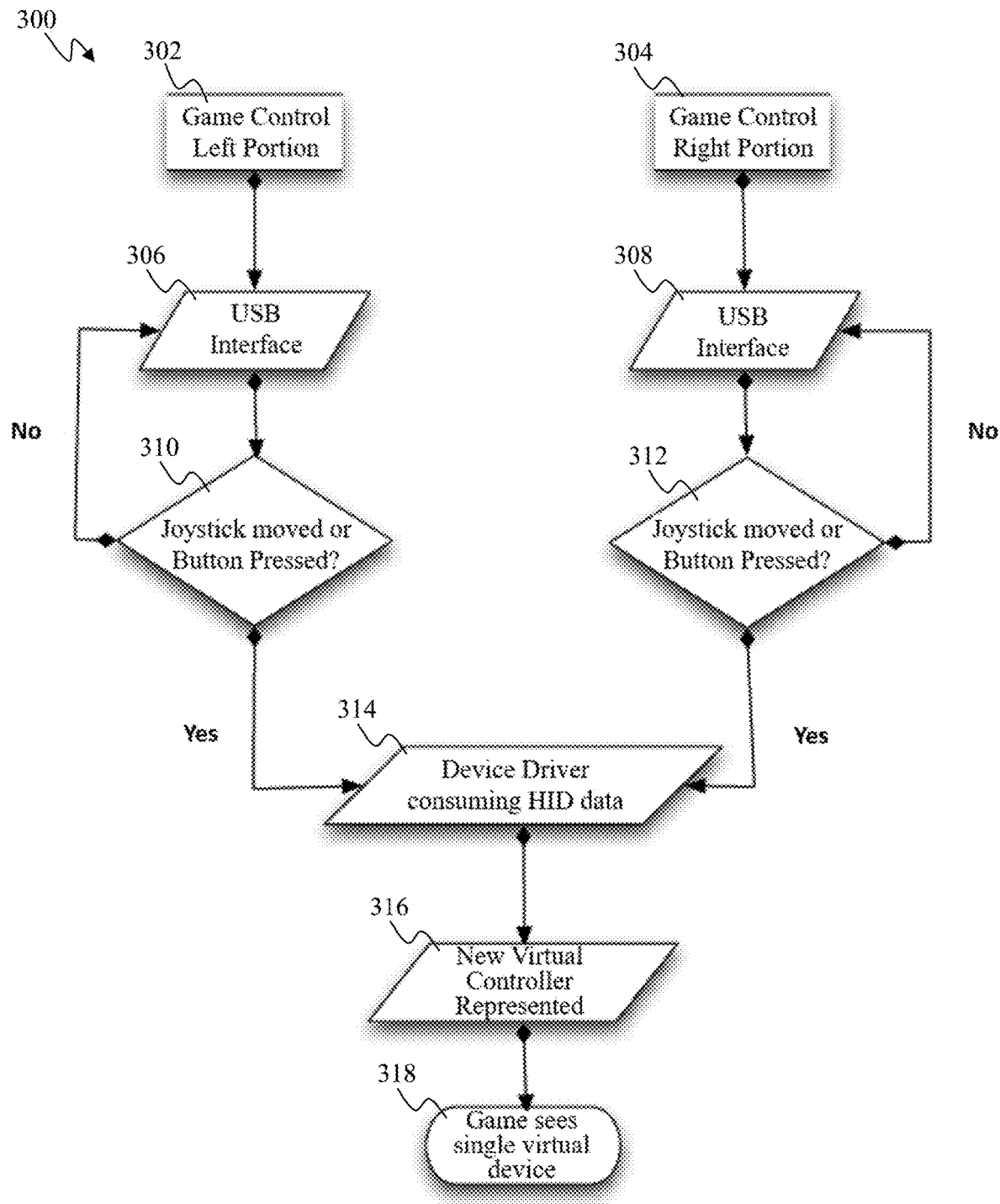
FIG. 3 illustrates a flow chart setting out the operation of gaming controllers in a mobile gaming device according to an embodiment.

FIG. 3 illustrates a flow chart setting out the operation of gaming controllers in a mobile gaming device according to an embodiment. The flow chart 300 of FIG. 3 can correspond to the operation of gaming controllers in a mobile gaming device, as shown and described in FIGS. 2A and 2B. In flow chart 300, left gaming controller 222 is schematically represented by game control left portion block 302, while right gaming controller 224 is schematically represented by game control left portion block 304. A USB interface 306 can be provided for left controller 222 and USB interface 308 can be provided for right controller 224. A monitoring block 310 can be provided for determining if a joystick 226 is moved or a gaming control button 228 is depressed on the left controller 222 and if so, HID information is sent from the left controller 422 to the mobile device 210 over USB interface 306. If no movement or control input is detected, a loop back is made to continue monitoring USB interface 306 for any left controller input from the left controller 222. If movement or control input is detected, the process flow carries on. HID input is delivered from the left controller 222 to the USB port 240 of the mobile device 210 and to the device driver 244. Correspondingly, a monitoring block 312 is provided for the right controller 224, operating in a similar manner.

At 314, device driver 244 receives and consumes HID data from either the left controller 222 or the right controller 224 for processing. In embodiments, the device driver 244 receives from both the left controller 222 and the right controller 224 for processing. In embodiments, the device driver 244 receives controller information from either or both of the left controller 222 or the right controller 224 within a predetermined sampling period and proceeds to process the received controller information. According to various embodiments, left controller input and right controller input are received as separate data packets by the mobile device 210. In embodiments, the left controller input and the right controller input can include an identifier in the corresponding data packet, to identify the data packets as being from a left controller or a right controller.

At 316, a virtual controller is formed, based on the input received from the device driver at 318. The virtual controller can be formed with the virtual controller module 252, which can combine the received data packets obtained from the left controller 222 and/or the right controller 224 to form a virtual gaming controller with a single controller input representation. In an embodiment, a predetermined sampling period is provided, and any left controller input or right controller input received by the device driver 244 during the sampling period is provided to the virtual controller module for forming a virtual gaming controller with single or combined controller input representation. At 318, the virtual gaming controller including combined controller input is provided to the software application for handling. It is thus noted that the software gaming application only sees a single virtual device, instead of the physically connected separate gaming controllers delivering separate HID data.

Figure 4:
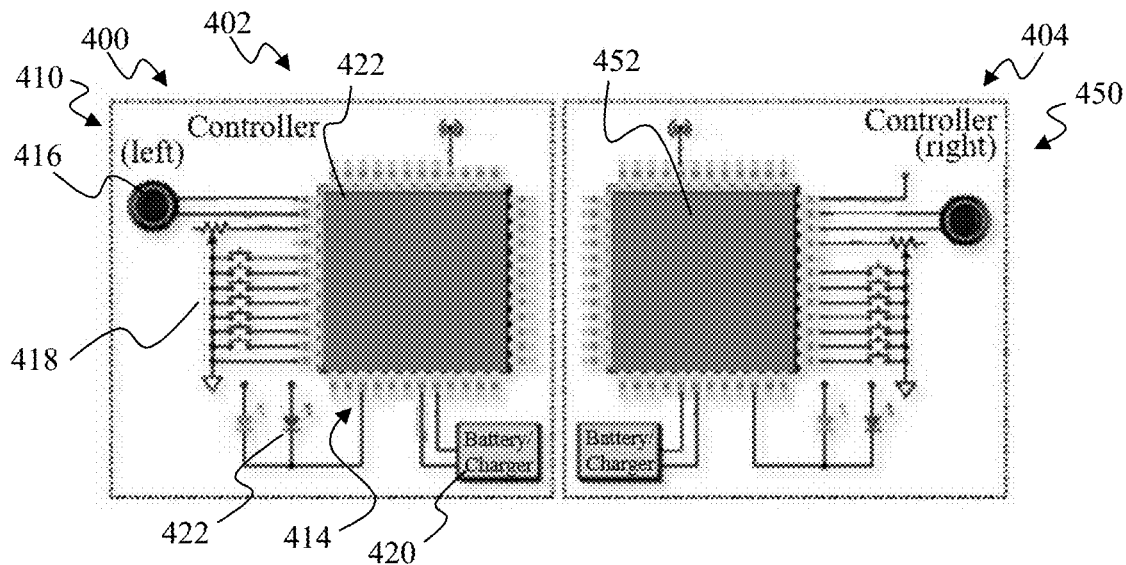
FIG. 4 illustrates a circuit schematic of hardware gaming controllers according to an embodiment.

FIG. 4 illustrates a circuit schematic of hardware gaming controllers according to an embodiment. Circuit representation 400 illustrates a possible circuit layout in representation of hardware component connections for a left gaming controller 402 and a right gaming controller 404 according to an embodiment. The gaming controllers are configured to be physically coupled to a mobile device to provide a mobile gaming device, in a manner similar to that of mobile gaming device 100. According to an embodiment, the gaming controllers 402, 404 can be configured for wireless data communication coupling to the mobile device. HID information generated by the gaming controllers 402, 404 are thus provided to the mobile device through wireless data communication.

Such a wireless data communication coupling can be a Bluetooth connection, but other wireless data couplings can be provided as appropriate. In such a case, a Bluetooth transceiver is provided in both the left gaming controller and the right gaming controller. Further, the mobile device can include multiple Bluetooth transceivers, one for communication with the left gaming controller and another for communication with the right gaming controller, or a single transceiver that is capable of hosting multiple Bluetooth channels for communication, and thus capable of communicating with multiple peripheral devices concurrently. The mobile device can host not only the dual gaming controllers wirelessly, but also maintain wireless communication with other computing peripherals, for example, speakers, keyboards, computer mice, etc.

Circuit 410 provides a representation of the hardware component connections in relation to the left gaming controller 402. A programmable controller 412 can be provided in the left gaming controller 402, arranged to carry out functionality relating to operating a gaming controller. The controller 412 can include a microcontroller processor for carrying out various functionalities and can be arranged to receive a plurality of inputs and generate a plurality of outputs. A plurality of GPIO pins 414 can be provided for communication with various components on the left gaming controller 402. The left gaming controller 402 can have components in communication with the controller 412, such as a joystick controller 416 and various gaming control buttons 418.

Controller 412 can include a radio frequency (RF) transmitter incorporated into the integrated circuit of the controller 412, the RF transmitter capable of establishing a Bluetooth connection with a compatible receiver for wireless data communication. The transmitter can also be a Bluetooth transceiver, arranged to send and receive information to and from the mobile device. Such a transceiver is useful to receive feedback from the mobile device, for communication back to the user. Gaming control data can be sent to the mobile device for use in a gaming application, and in return the gaming application can provide information back to the controller for user consumption, for example, instructions to carry out a vibration of the gaming controller in response to a user's actions in a gaming application.

The Bluetooth transmitter can be a Bluetooth Low Energy Technology-based transmitter, which allows for a wireless data communication with low power consumption, allowing for longer usage in operation. In embodiments, the left gaming controller 402 can include a separate Bluetooth transmitter or transceiver, arranged to wireless couple to a corresponding receiver on the mobile device, and send data information over the wireless coupling. The Bluetooth transmitter can be coupled to the controller 412 through one or more of the GPIO pins 414.

In enabling operation of the controller 412 as well as wireless data communication, a power source is required. Left gaming controller 402 can include a battery pack 420 for delivery of electrical power to the controller 412. In embodiments, the left gaming controller 402 can be decoupled from the mobile device, and the left gaming controller 402 be plugged into an electrical source for charging the battery pack 420. In embodiments, the left gaming controller 402 can include an electrical coupling to the mobile device, where the battery source of the mobile device can be coupled to the battery pack 420 of the left gaming controller 402, for shared charge dissipation, or for priority charge dissipation, where a certain battery source is depleted first before another. In an embodiment, in coupling battery sources, the battery source of the mobile device is configured to be drained first, while not utilizing charge on the left gaming controller 402. The mobile device can then be plugged into an electrical source for charging and maintaining the charge level of its battery source.

Further, the battery pack 420 can include a sensor in the battery pack which can be coupled to the controller 412 to provide information on the status of the battery pack 420, for example, amount of charge remaining in the battery pack 420. Controller 412 can further be connected to a battery indication LED 422 in the left gaming controller, to provide an indication of the battery status. The left gaming controller 402 can further include a status LED for indication of the activation of the controller.

Circuit 450 provides a representation of the hardware component connections in relation to right gaming controller 404. A programmable controller 452 can be provided in the right gaming controller 404, arranged to carry out functionality relating to operating a gaming controller. Similarly, the controller 452 can include a capability to carry out a Bluetooth function or communication. According to an embodiment, the left gaming controller 402 is equivalent to the right gaming controller 404, except operating for receiving input from different sides for a user. As such, the circuit 410 for the left gaming controller 402 is equivalent to the circuit 450 for the right gaming controller 404.

Figure 5:
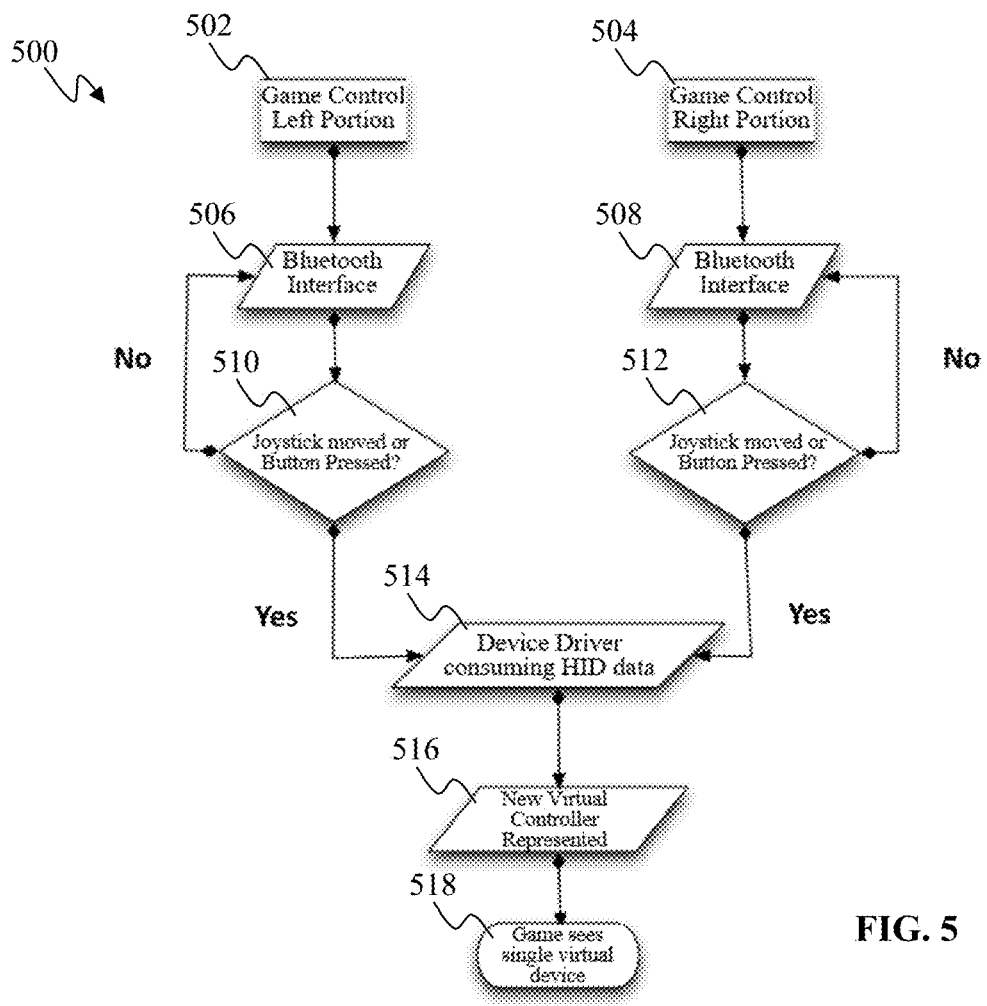
FIG. 5 illustrates a flow chart setting out the operation of gaming controllers in a mobile gaming device according to an embodiment.

FIG. 5 illustrates a flow chart setting out the operation of gaming controllers in a mobile gaming device according to an embodiment. The flow chart 500 of FIG. 5 can correspond to the operation of gaming controllers in a mobile gaming device, as shown and described in FIG. 4. In flow chart 500, the left gaming controller 402 is schematically represented by game control left portion block 502, while the right gaming controller 404 is schematically represented by game control left portion block 504. A Bluetooth interface 506 can be provided for the left controller 402 and Bluetooth interface 508 can be provided for the right controller 404. A monitoring block 510 can be provided for determining if a joystick 416 is moved or a gaming control button 418 is depressed on the left controller 402 and if so, HID information is sent from the left controller 402 to the mobile device over Bluetooth interface 506. If no movement or control input is detected, a loop back is made to continue monitoring Bluetooth interface 506 for any left controller input from the left controller 402. If movement or control input is detected, the process flow carries on. HID input is delivered from the left controller 402 through a Bluetooth connection made between the controller 412 and a corresponding receiver on the mobile device. The HID input is subsequently provided to device driver in the mobile device. Correspondingly, a monitoring block 512 is provided for the right controller 404, operating in a similar manner.

At 514, the device driver receives and consumes HID data from either the left controller 402 or the right controller 404 for processing. The device driver can receive HID input from the left controller 402 only, from the right controller 404 only, or from the left controller 402 and the right controller 404, either concurrently, or within a predetermined time period or sampling period. The device driver upon receiving HID controller input proceeds to process the received controller information. According to various embodiments, left controller input and right controller input are received as separate data packets by the mobile device. In embodiments, the left controller input and the right controller input can include an identifier in the corresponding data packet, to identify the data packets as being from a left controller or a right controller.

At 516, a virtual controller is formed, based on the input received from the device driver at 518. The mobile device can include a virtual controller module which can be arranged to combine the received data packets obtained from the left controller 402 and/or the right controller 404 to form a virtual gaming controller with a single controller input representation. At 518, the virtual gaming controller including combined controller input is provided to the software application for handling. It is thus noted that the software gaming application only sees a single virtual device, instead of the physically connected separate gaming controllers delivering separate HID data.

Figure 6A:
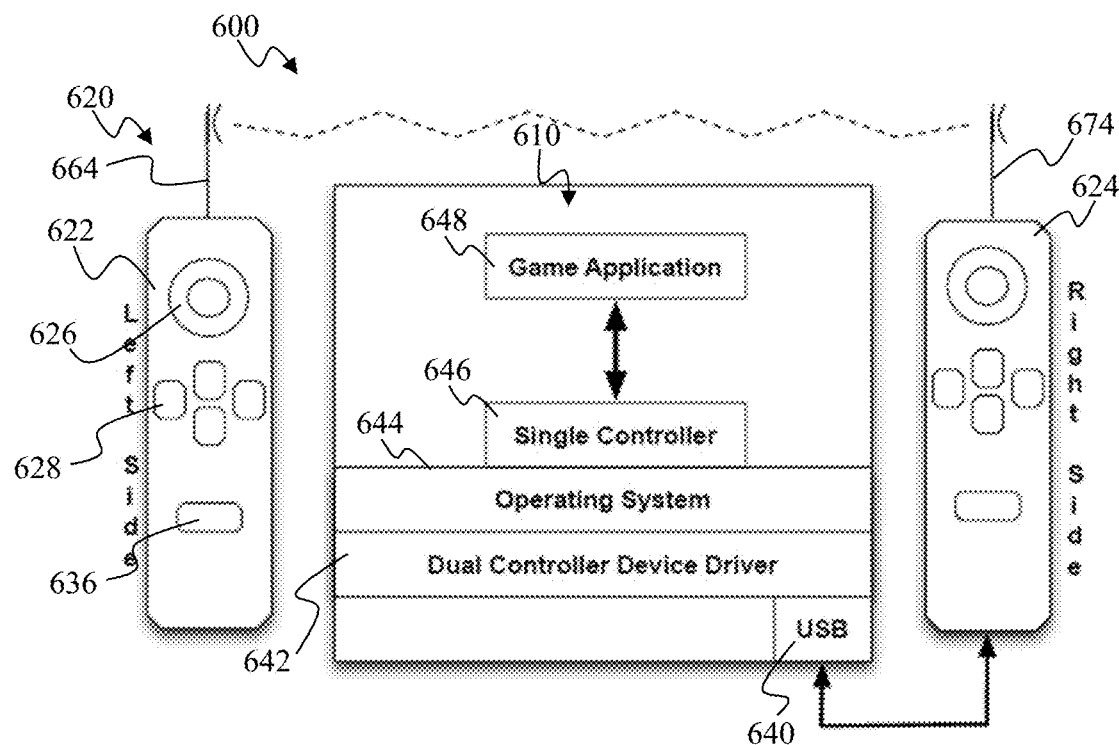
FIG. 6A illustrates a schematic representation of a mobile gaming device according to an embodiment.

FIG. 6A illustrates a schematic representation of a mobile gaming device 600 according to an embodiment. Controllers 620 are provided for a mobile device 610. First left-side hardware controller 622 and second right-side hardware controller 624 are provided and arranged for coupling with the mobile device 610. The gaming controllers 620 can include a variety of hardware controller buttons, for example, joystick 626, gaming control buttons 628, etc. Other buttons or functionality can be included, where needed.

According to an embodiment, one of the pair of controllers 620 can be arranged to send its state or any controller input wirelessly, for example through a radio frequency, to update its status. In an embodiment, the left controller 622 is arranged to wirelessly send controller input to the right controller 622. Right controller is thereafter arranged to send both the left controller input and the right controller input, in separate data packets, to the mobile device 610. Left controller 622 can include a Bluetooth transmitter 664 to carry out such a wireless transmission to right controller 624. Correspondingly, right controller 624 can include a Bluetooth receiver 674 to receive such wireless transmission from left controller 622. Further, right controller 624 can include a USB plug for coupling to a USB port 640 on the mobile device 610.

HID input is generated from the left controller 622 in response to user input or manipulation of the joystick or gaming control buttons of the left controller 622. Such HID information for the left controller, or left controller input, can then be wirelessly delivered to the right controller 624. Right controller 624 can also generate HID input, or a right controller input, in response to user input or manipulation of the joystick or gaming control buttons of the left controller 624. The left controller input and the right controller input are handled as separate or distinct data packets in the right controller 624, and both the left controller input and the right controller input are subsequently provided to the mobile device 610 through the USB coupling through USB port 640.

Mobile device 610 can further include a device driver 642, the device driver 642 arranged to receive HID input from the controllers 620 for further processing in interpretation of the HID input for computing consumption on the operating system 644. Device driver 642 communicates with an operating system program 644 running on the mobile device 610, supported by mobile device processor and a memory module. Mobile device 610 further includes a virtual controller module 646. Virtual controller module 646 can operate on the processor of the mobile device, for example in the operating system 644, and is arranged to receive HID input from the gaming controllers 620. The virtual controller module 644 is further configured to combine both the left controller input and the right controller input to form a single controller input representation that contains all the elements of a combined controller. Such a single controller representation is then passed on to a game application 648 running on the mobile device 610.

In embodiments, left controller 622 is arranged to wirelessly send controller input to the right controller 622, and right controller is thereafter arranged to also wirelessly send both the left controller input and the right controller input, in distinct data packets and with appropriate identifiers, to the mobile device 610. In such a case, Bluetooth transceivers are provided in both controllers 620, as well as in the mobile device 610.

According to various embodiments, one of the gaming controllers can combine separate controller information, prior to providing a single controller representation to the mobile device. Accordingly, the gaming controllers can include a primary game controller and a secondary game controller. In an embodiment, the right controller can be the primary game controller and the left controller is the secondary game controller. A wireless connection is provided between the controllers, and left controller input is sent to the right controller input upon manipulation by a user and generation thereafter. Right gaming controller can also generate a right controller input similarly. Right gaming controller can include a programmable controller which can be configured to receive left controller input and combine it with the right controller input to form a virtual gaming controller with a single controller input representation. The right gaming controller thereafter provides the single controller input representation to the mobile device for provision to the gaming application.

Figure 6B:
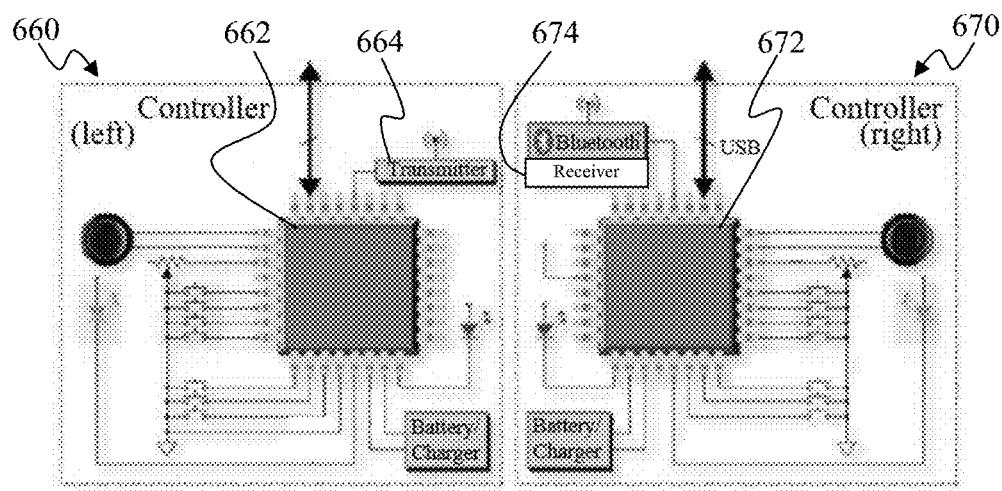
FIG. 6B illustrates a circuit schematic of the hardware gaming controllers of FIG. 6A.

FIG. 6B illustrates a circuit schematic of the hardware gaming controllers of FIG. 6A. Circuit 660 provides a representation of the hardware component connections in relation to left gaming controller 622. A programmable controller 662 can be provided in the left gaming controller 622, arranged to carry out functionality relating to operating a gaming controller. Further, a wireless transmitter 664 is provided and coupled to the controller 662. The wireless transmitter 664 can be a Bluetooth transmitter.

Correspondingly, Circuit 670 provides a representation of the hardware component connections in relation to right gaming controller 624. A programmable controller 672 can be provided in the left gaming controller 624, arranged to carry out functionality relating to operating a gaming controller. A wireless receiver 674 is provided and coupled to the controller 672. The wireless receiver 674 can be a Bluetooth receiver. According to embodiments, the left controller 662 is configured to generate a left controller input based on user manipulation of the left gaming controller 622. The left controller input is thereafter sent from the wireless transmitter 664 of left gaming controller 622 to the wireless receiver 674 of right gaming controller 624. In embodiments, both controllers 620 can include wireless transceivers for dual directional wireless data communication.

Right gaming controller 624 further includes a USB plug, which can be coupled to the controller 670, the USB plug for establishing a data communication coupling with the USB port 640 of the mobile device. Right controller 674 is arranged to deliver left controller input and right controller input as distinct data packets to the mobile device 610. In embodiments, right controller 674 is arranged to deliver left controller input and right controller input as a virtual gaming controller with a single controller input representation to the mobile device 610. In various embodiments, both left controller 662 and right controller 672 can be Bluetooth enabled, instead of providing separate transmitters or transceivers in the gaming controllers 620.

Figure 7:
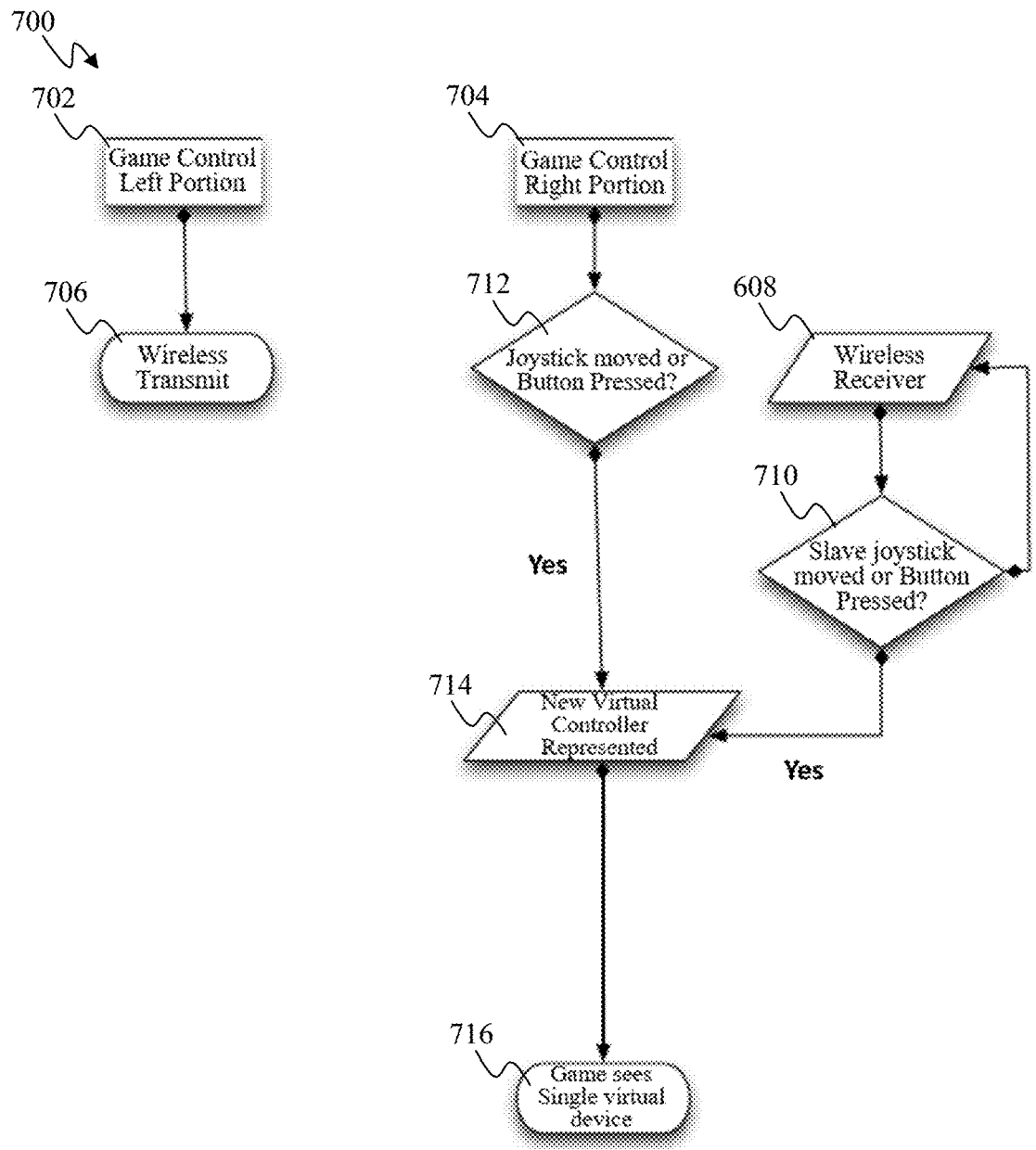
FIG. 7 illustrates a flow chart setting out the operation of gaming controllers in a mobile gaming device according to an embodiment.

FIG. 7 illustrates a flow chart setting out the operation of gaming controllers in a mobile gaming device according to an embodiment. The flow chart 700 of FIG. 7 can correspond to the operation of gaming controllers in a mobile gaming device, as shown and described in FIGS. 6A and 6B. In flow chart 700, the left gaming controller 622 is schematically represented by game control left portion block 702, while the right gaming controller 624 is schematically represented by game control left portion block 704. A wireless transmitter 706 can be provided for the left controller 622 for wirelessly coupling to the right controller 624, and the left controller 622 can wirelessly generate and transmit left controller input to the right controller 624. Right controller 624 can include a wireless receiver 708 for wirelessly coupling to the left controller 622.

A monitoring block 710 can be provided for determining if a joystick is moved or a gaming control button is depressed on the right controller 624 and HID information is sent from the left controller 622 to the right controller 624, from wireless transmitter 706 to wireless receiver 708. If no movement or control input is detected, a loop back is made to continue monitoring the wireless receiver 708 having a wireless transmission coupling for any left controller input from the left controller 622. Further, the left controller input received by the right controller 624 is subsequently relayed or delivered to the mobile device 610 through a USB interface between the right controller 624 and the mobile device 610. Monitoring block 712 can be provided for determining if a joystick is moved or a gaming control button is depressed on the right controller 624 and if so, HID information is sent from the right controller 622 to the mobile device 610 over the USB interface between the right controller 624 and the mobile device 610.

A device driver 642 can be provided on the mobile device 610 to receive HID data from either the left controller 622 or the right controller 624 for processing. The device driver can receive HID input from the left controller 402 only, from the right controller 404 only, or from the left controller 402 and the right controller 404, either concurrently, or within a predetermined time period or sampling period. In an embodiment, the device driver 642 can receive from the right controller 624 a virtual gaming controller input with HID information including a single controller input representation formed through a combination of a left controller input and a right controller input. The device driver upon receiving HID controller input proceeds to process the received controller information.

At 714, a virtual controller is formed, based on the input received from the device driver. The mobile device 610 can include a virtual controller module 646 which can be configured to combine the received data packets obtained from the left controller 622 and/or the right controller 624 to form a virtual gaming controller with a single controller input representation. In an embodiment, the controller 672 of the right gaming controller 624 receives left controller input, and carries out a combination of left controller input and right controller input to form a virtual controller with a single controller input representation. The virtual controller is subsequently provided to the mobile device 610 through the USB interface between the right controller 624 and the mobile device 610. At 716, the virtual gaming controller including combined controller input is provided to the software application 648 for handling.

Figure 8:
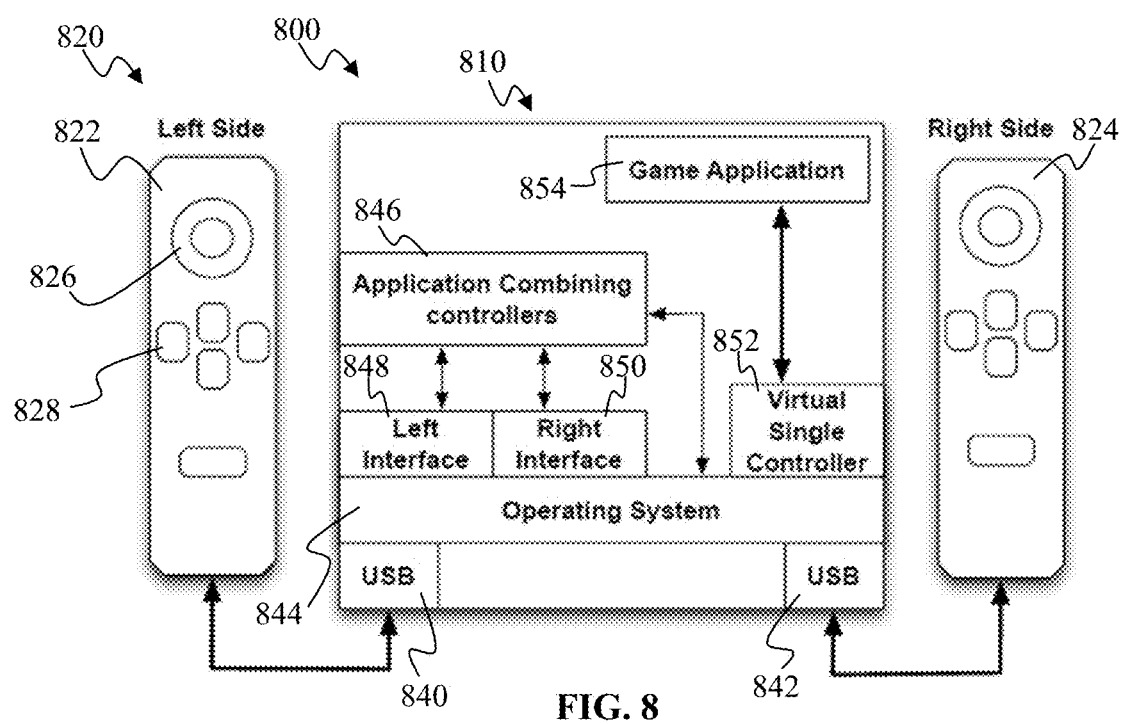
FIG. 8 illustrates a schematic representation of a mobile gaming device 800 according to an embodiment.

FIG. 8 illustrates a schematic representation of a mobile gaming device 800 according to an embodiment. Controllers 820 are provided for a mobile device 810. First left-side hardware controller 822 and second right-side hardware controller 824 are provided and arranged for coupling with the mobile device 810. The gaming controllers 820 can include a variety of hardware controller buttons, for example, joystick 826, gaming control buttons 828, etc. Other buttons or functionality can be included, where needed. Mobile device 810 can include a left USB port 840 for coupling with a USB plug on the left controller 822 and a right USB port 842 for coupling with a USB plug on the right controller 824. Left controller 822 and right controller 824 generate left controller input and right controller input respectively, based on user input or manipulation. The left controller input and right controller input are sent to the mobile device through left USB port 840 and right USB port 842 respectively.

According to an embodiment, device drivers are not included in the mobile device 810 for HID input interpretation. In an embodiment, a combination application 846 operating on the operating system 844 of the mobile device can receive HID information from controllers 820 and can create a virtual controller in combining the left controller input and right controller input. The combination application 846 can include a left controller interface 848 and a right controller interface 850. The left controller input and right controller input are received by the operating system 844 in the mobile device from left USB port 840 and right USB port 842 respectively. The left controller input is thereafter provided to the left controller interface 848 of the combination application 846 and the right controller input is provided to the right controller interface 850 of the combination application 846. Further, it is noted that in providing the left controller input and the right controller input directly to the operating system 844, a controller representation is formed for both left controller input and the right controller input.

The combination application 846 is configured to create a new game controller or a virtual game controller representation, which can include a single controller input representation that contains all the elements of a combined controller based on both the left controller input and the right controller input. The combination application 846 can be configured to create the virtual game controller representation 852 on the operating system. The virtual controller representation 852 is thereafter passed on to a game application 854 running on the mobile device 810. Such a mobile gaming device 800 can be provided if the gaming application 854 running on the operating system 844 can support the selection of a game controller from multiple controller inputs. In such a way, the combined virtual controller input is utilized, and the hardware-generated left controller input and right controller input are ignored. The operation system 844 can be a Windows, Linux or Android operating system, which allows for virtual USB devices to be introduced in application space. It can be noted that a Linux or Android operating system can allow for HID inputs to be sent directly into a kernel on the operating system, in creating a virtual device.

In various embodiments, two game controllers can be connected to a mobile device without using the generic HID protocol, but using, for example, vendor-specific device interface protocols. Such an instance would prevent the operation system from creating unwanted interfaces, for example left interface 848 and right interface 850 as described above, for the physical controller devices. A user space application can be provided on the operating system of the mobile device to communicate with each of the left gaming controller and the right gaming controller using raw USB or Bluetooth data. The user space application then combines the left and right controller information together to create a single virtual controller, on or using the operating system. In comparison with mobile gaming device 800 in the embodiment described above, the user space application combines all information into a single virtual device, instead of the gaming application choosing from between the physical left and right controller and the virtual controller with combined data. The single virtual device representation is then sent to the operating system and the gaming application, which will only detect a single controller which is the virtual device representation.

In an embodiment, the user space application then combines the left and right controller information together to create a single virtual controller representation in user space. The controllers can use standard HID protocols to connect, which then informs the operating system, for provision to the game application. The game application may thus be provided with three devices, and a user can select the single virtual controller representation for input into the game.

Figure 9:
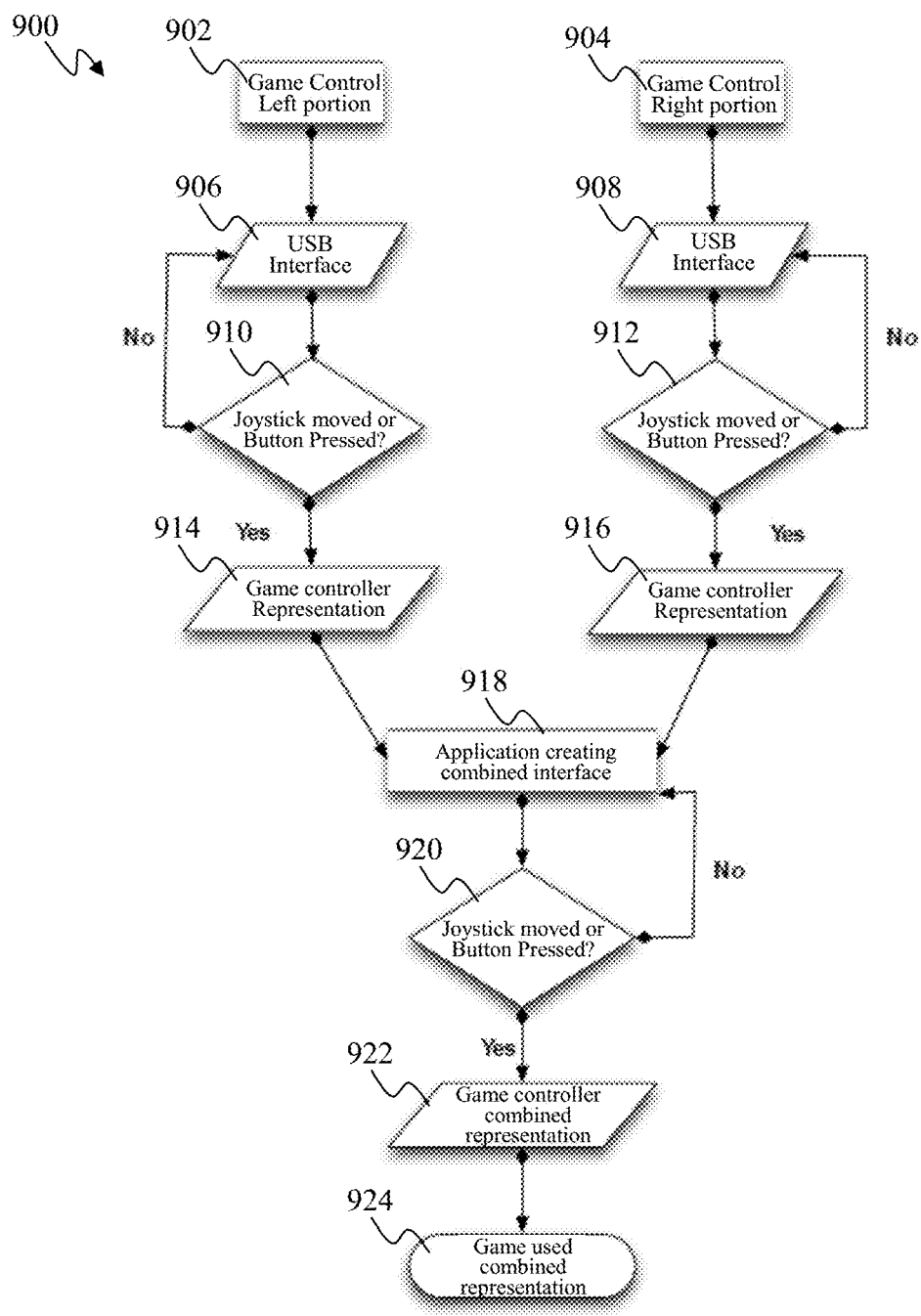
FIG. 9 illustrates a flow chart setting out the operation of gaming controllers in a mobile gaming device according to an embodiment.

FIG. 9 illustrates a flow chart setting out the operation of gaming controllers in a mobile gaming device according to an embodiment. The flow chart 900 of FIG. 9 can correspond to the operation of gaming controllers in a mobile gaming device, as shown and described in FIG. 8. In an embodiment, the flow chart 900 can represent where a user space application is utilized for representation. The user space application can utilize standard HID protocols, a proprietary format using USB, Bluetooth, or wireless protocols. In flow chart 900, left gaming controller 822 is schematically represented by game control left portion block 902, while right gaming controller 824 is schematically represented by game control left portion block 904. A USB interface 906 can be provided for left controller 822 and USB interface 908 can be provided for right controller 824. A monitoring block 910 can be provided for determining if a joystick is moved or a gaming control button is depressed on the left controller 822 and if so, HID information is sent from the left controller 822 to the mobile device 810 over USB interface 906. If no movement or control input is detected, a loop back is made to continue monitoring USB interface 906 for any left controller input from the left controller 822. If movement or control input is detected, the process flow carries on. HID input is delivered from the left controller 822 to the USB port 840 of the mobile device 810. Correspondingly, a monitoring block 912 is provided for the right controller 224, operating in a similar manner.

In receiving left controller input from left USB port 840, which is then provided to the operating system 844, a left controller representation 914 can be formed, based on the left controller input. Left controller representation 914 can be formed in the user space application. Operating system 844 further can receive right controller input from right USB port 842, through which a right controller representation 916 is formed, based on the right controller input. Right controller representation 916 can be formed in the user space application. At 918, a combination application can receive left controller representation 914 or right controller representation 916. Such a combination application can include logic or software portions in the user space application which can combine the representative input 916, 918, into a single controller representation. In embodiments, the combination application can receive left controller input or right controller input, which can also be part of the left controller representation 914 or right controller representation 916. A virtual controller is thereafter formed, based on the left controller input and the right controller input.

A further monitoring block 920 is included, for which determines whether a controller event occurs, i.e. if a joystick is moved or a gaming control button depressed, on any one of the controllers. If so, the single virtual controller representation is thereafter sent into the operating system. At 922, the operating system receives the game controller combined representation, and can translate HID information for the virtual game controller input. Block 922 can be considered the interface to the operating system of a virtual HID device. At 924, the game application can receive the translated HID information for utilization of a user's gaming input.

In various embodiments, a keyboard can be provided in two portions, each portion for connecting to a processor for usage as a single device, based on a single virtual controller representation, derived according to the present disclosure. A keyboard can be cut in half and each half placed into devices using the HID protocol. The operating system would see two different keyboards, each just being half of a proper keyboard. According to an embodiment, by providing a single virtual keyboard representation, a software application can receive input from a single keyboard, allowing for macro functions or even activation of secondary functions with e.g. the shift or control key, which would not work if received from two separate keyboards, to work.

Figure 10:
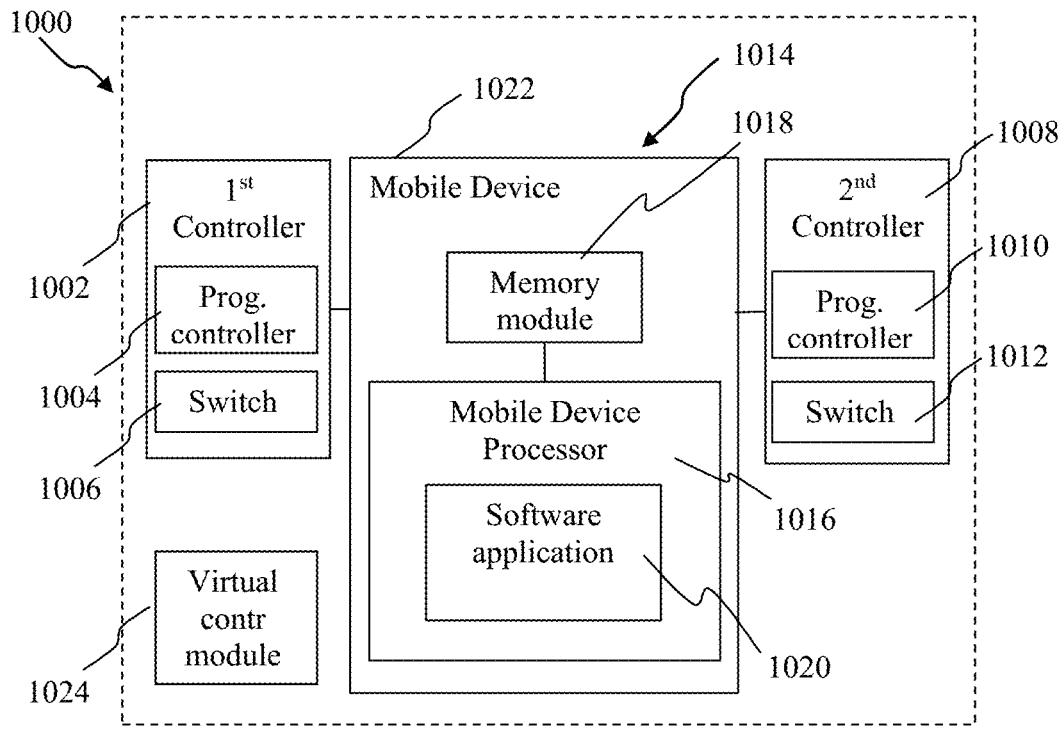
FIG. 10 illustrates a schematic of a gaming controller according to an aspect of the present disclosure.

FIG. 10 illustrates a schematic of a gaming controller for a mobile device according to an aspect of the present disclosure. Gaming controller 1000 can include a first hardware gaming controller 1002 including a first programmable controller 1004 and at least one input switch 1006, the at least one input switch 1006 of the first hardware gaming controller 1002 configured to be manipulated by a user's left thumb and/or fingers to generate a left controller input with the first programmable controller 1004. The gaming controller 1000 can also include a second hardware gaming controller 1008 including a second programmable controller 1010 and at least one input switch 1012, the at least one input switch 1012 of the second hardware gaming controller configured to be manipulated by a user's right thumb and/or fingers to generate a right controller input with the second programmable controller 1010.

Further the first hardware gaming controller 1002 and the second hardware gaming controller 1008 are each configured to be removably coupleable with a mobile device 1014 including a mobile device processor 1016 coupled to a memory module 1018 and configured to run a software application 1020. According to embodiments, the first hardware gaming controller is configured to be mechanically secured to a side portion of a housing 1022 of the mobile device, and the second hardware gaming controller is configured to be mechanically secured to an opposing side portion of the housing 1022 of the mobile device. In embodiments, the left controller input and the right controller input are combined with a virtual controller module 1024 to form a virtual gaming controller with a single controller input representation for providing to the software application 1020.

In an embodiment, the first hardware gaming controller, for example the first programmable controller in the first hardware gaming controller, includes a serial bus connection to the mobile gaming processor and the second hardware gaming controller for example the second programmable controller in the second hardware gaming controller, includes a separate serial bus connection to the mobile device processor.

In an embodiment, the first hardware gaming controller includes a first wireless transceiver coupled to the first programmable controller and the second hardware gaming controller includes a second wireless transceiver coupled to the second programmable controller, for establishing a wireless data coupling.

In an embodiment, the first hardware gaming controller and the second hardware gaming controller are configured to establish separate wireless data couplings to the mobile device processor.

In an embodiment, a wireless data coupling is configured to be established between the first programmable controller in the first hardware gaming controller and the second programmable controller in the second hardware gaming controller. In an embodiment, a wireless data coupling is established between the first programmable controller and the second programmable controller.

In an embodiment, any one of the first hardware gaming controller or the second hardware gaming controller includes a serial bus connection to the mobile device processor. In an embodiment, any one of the first hardware gaming controller or the second hardware gaming controller further establishes a wireless data coupling to the mobile device.

In an embodiment, the wireless data coupling is any one of a Bluetooth connection, a Wireless Universal Serial Bus (WUSB) connection, a radio frequency connection, or an infrared data connection.

In an embodiment, the mobile device processor is configured to receive the left controller input and the right controller input as distinct data packets.

In an embodiment, an operating system running on the mobile device processor is configured to receive the left controller input and the right controller input as distinct data packets, the virtual controller module is configured for operation on the operating system.

In an embodiment, a device driver running on the mobile device processor is configured to receive the left controller input and the right controller input as distinct data packets, for interpreting the data packets for communication with the operating system.

In an embodiment, further including a data coupling between the first programmable controller in the first hardware gaming controller and the second programmable controller in the second hardware gaming controller; wherein the virtual controller module is configured for operation on any one of the first programmable controller or the second programmable controller.

According to an aspect of the present disclosure, there can be provided a mobile device for gaming, including: a mobile computer, including a housing and a mobile device processor coupled to a memory module and provided within the housing, the mobile device processor configured to run a software application; a first hardware gaming controller mechanically secured to a side portion of the housing of the mobile computer, the first hardware gaming controller including a first programmable controller and at least one input switch, the at least one input switch of the first hardware gaming controller configured to be manipulated by a user's left thumb and/or fingers to generate a left controller input with the first programmable controller; and a second hardware gaming controller mechanically secured to an opposing side portion of the housing of the mobile computer, the second hardware gaming controller including a second programmable controller and at least one input switch, the at least one input switch of the second hardware gaming controller configured to be manipulated by a user's right thumb and/or fingers to generate a right controller input with the second programmable controller; a virtual controller module configured to combine the left controller input and the right controller input to form a virtual gaming controller with a single controller input representation for providing to the software application.

Figure 11:
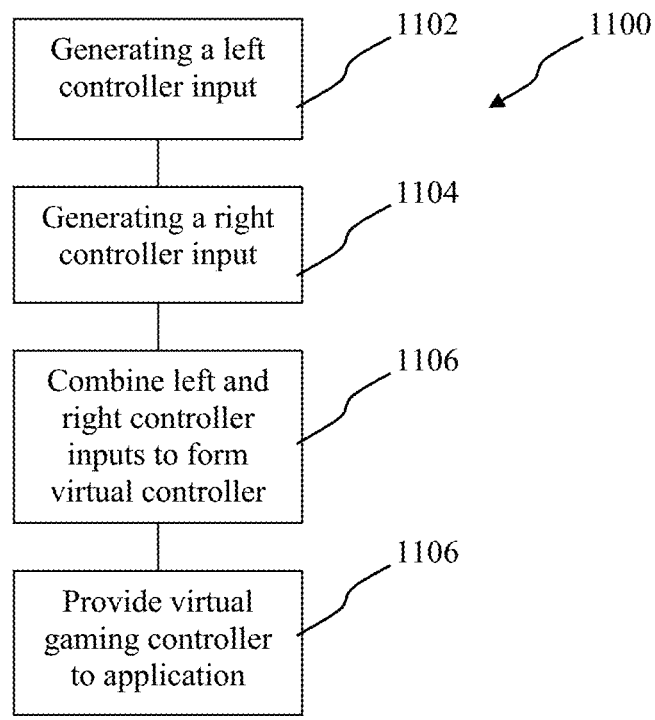
FIG. 11 illustrates a block diagram of a method according to an aspect of the present disclosure.

FIG. 11 illustrates a block diagram of a method according to an aspect of the present disclosure. Method 1100 can be a method of operating a gaming controller including a first hardware gaming controller and a second hardware gaming controller each configured to be removably coupleable with a mobile device, the first hardware gaming controller configured to be mechanically secured to a side portion of a housing of a mobile device, and the second hardware gaming controller configured to be mechanically secured to an opposing side portion of the housing of the mobile device. In 1102, the method can include generating a left controller input with a first programmable controller in the first hardware gaming controller, the first hardware gaming controller configured to be manipulated by a user's left thumb and/or fingers. In 1104, the method can include generating a right controller input with a second programmable controller in the second hardware gaming controller, the second hardware gaming controller configured to be manipulated by a user's right thumb and/or fingers. In 1106, the method can include combining the left controller input and the right controller input to form a virtual gaming controller with a single controller input representation. In 1108, the method can include providing the virtual gaming controller to a software application operating on a mobile processor in the mobile device.

In an embodiment, the method includes sending the left controller input and the right controller input separately each through a serial bus connection to the mobile device processor.

In an embodiment, the method includes sending the left controller input to the mobile device processor through a first serial bus connection between the first hardware gaming controller and the mobile computer.

In an embodiment, the method includes sending the right controller input to the mobile device processor through a second serial bus connection between the second hardware gaming controller and the mobile device.

In an embodiment, the method includes sending the left controller input to the mobile device processor through a first wireless data coupling between the first hardware gaming controller and the mobile device.

In an embodiment, the method includes sending the right controller input to the mobile device processor through a second wireless data coupling between the second hardware gaming controller and the mobile device.

In an embodiment, the method includes sending controller input from the any one of the first hardware gaming controller or the second hardware gaming controller to the corresponding second hardware gaming controller or first hardware gaming controller respectively, through a wireless data coupling.

In an embodiment, the method includes sending the left controller input and the right controller input to the mobile device processor through any one of a serial bus connection or a wireless data coupling between the corresponding second hardware gaming controller or first hardware gaming controller and the mobile computer.

In an embodiment, the method includes receiving the left controller input and right controller input as distinct data packets, by the mobile device processor.

In an embodiment, the method includes combining the left controller input and the right controller input with the virtual controller module operating on the mobile device processor.

In an embodiment, the method includes interpreting the distinct data packets with a device driver on the mobile device processor.

In an embodiment, the method includes receiving the left controller input and the right controller input in any one of the first hardware gaming controller or the second hardware gaming controller, and combining the left controller input and the right controller input with the virtual controller module operating on any one of the first hardware gaming controller or the second hardware gaming controller.

According to various embodiments, there is provided at least one computer program product directly loaded into a non-transitory memory module of a digital computer provided in a mobile device of the present disclosure. The computer program product can include software code portions for performing the steps of a method according to an embodiment of the present disclosure when the at least one computer product is run on the at least one digital computer.

In various embodiments, there is provided a controller for carrying out an operational function in the mobile device, which can include, but not limited to, a first hardware gaming controller microcontroller, a second hardware gaming controller microcontroller, a mobile computer processing system, etc. The controller can include a digital computer configured to receive a computer program product. In embodiments, several digital computers or microprocessors are synchronized and operate cooperatively as part of an overall system.

Figure 12:
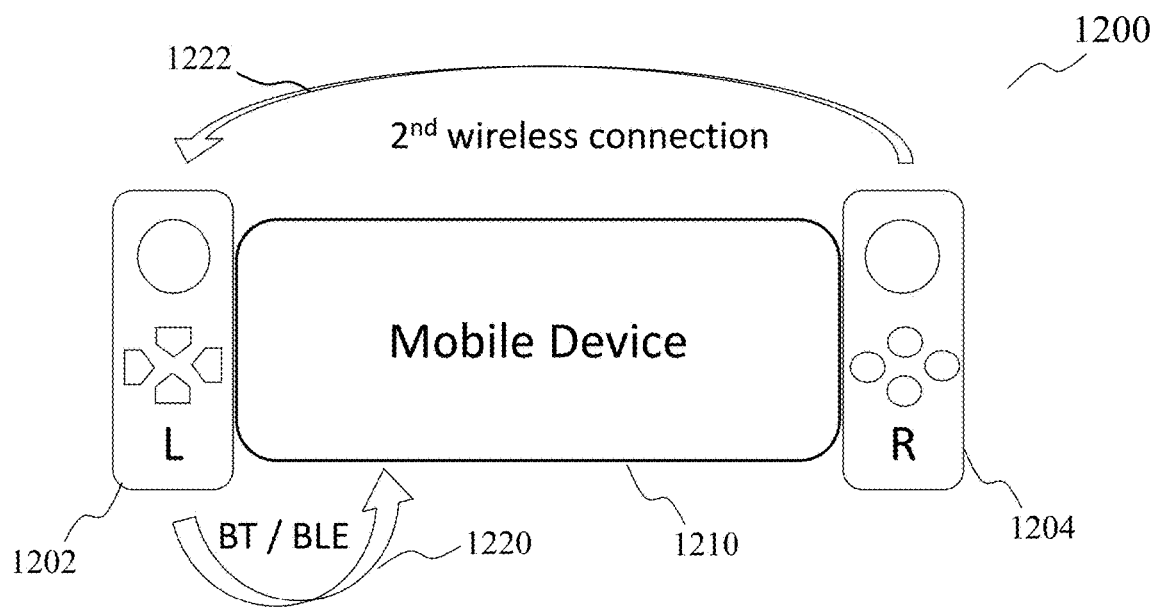
FIG. 12 shows a simplified diagram of a game controller for a mobile device according to various embodiments.

FIG. 12 shows a simplified diagram of a game controller 1200 for a mobile device 1210, according to various embodiments. The game controller 1200 may also be referred herein as a mobile gaming device, for example, mobile gaming device 100. The mobile device 1210 may be any one of the mobile devices 110, 210, 610, 810. The mobile device 1210 may be a portable computing device, such as a mobile phone. The game controller 1200 may include a first hardware gaming controller 1202 and a second hardware gaming controller 1204. The first hardware gaming controller 1202 may also be referred herein as a left hardware gaming controller, while the second hardware gaming controller 1204 may also be referred herein as a right hardware gaming controller. The first hardware gaming controller 1202 may be configured to be manipulated by at least one of a user's left thumb and fingers to generate a left controller input. The second hardware gaming controller 1204 may be configured to be manipulated by at least one of a user's right thumb and fingers to generate a right controller input. Each of the first hardware gaming controller 1202 and the second hardware gaming controller 1204 may be mechanically securable to a housing of the mobile device 1210. The housing may be a cover, or a casing, that may be shaped to receive the mobile device 1210. The first hardware gaming controller 1202 may be mechanically securable to a left side portion of the housing, while the second hardware gaming controller 1204 may be mechanically securable to a right side portion of the housing. Either the first hardware gaming controller 1202 or the second hardware gaming controller 1204 may be a primary game controller, also referred herein as a master game controller. The other hardware gaming controller may be a secondary game controller, also referred herein as a slave game controller. Each of the first hardware gaming controller 1202 and the second hardware gaming controller 1204 may include a transceiver for establishing wireless data coupling with one another and with the mobile device. The primary game controller may be configured to combine the left controller input and the right controller input into a single controller input representation for providing to the mobile device 1210. As a result, the mobile device 1210 may communicate with the two hardware controllers as if they are a single game controller device.

As an example, the first hardware gaming controller 1202 may be, or may operate as the primary game controller while the second hardware gaming controller 1204 may be the secondary game controller. The primary game controller may establish a first wireless connection 1220 with the mobile device 1210. The second hardware gaming controller 1204, operating as the secondary game controller, may transmit its right controller input to the primary game controller, through a second wireless connection 1222. The first wireless connection 1220 may employ a different wireless protocol from the second wireless connection 1222. For example, the first wireless connection 1220 may be a Bluetooth (BT) or Bluetooth Low Energy (BLE) connection. For example, the second wireless connection 1222 may be a WiFi connection. Alternatively, the first wireless connection 1220 and the second wireless connection 1222 may operate based on the same type of wireless protocol but at different frequency bands, or employ frequency hopping to deconflict the wireless signals. The primary game controller may combine the right controller input received through the second wireless connection 1222 with its own left controller input, to form a single controller input representation. The primary game controller may transmit the single controller input representation to the mobile device 1210 through the first wireless connection 1220. It should be understood that alternatively, the second hardware gaming controller 1204 may be the primary game controller while the first hardware gaming controller 1202 may be the secondary game controller. The choice of operation mode of the hardware gaming controllers will be explained in further details in subsequent paragraphs.

According to various embodiments, the hardware gaming controllers may each be configured to determine their respective operating modes. Each hardware gaming controller may determine whether it is paired to the mobile device 1210. Upon determining that it is the only hardware gaming controller that is paired to the mobile device 1210, or that it is connected to the mobile device 1210 before the other hardware gaming controller is also connected to the mobile device 1210, the hardware gaming controller may assume the role of the master game controller. In other words, if the hardware gaming controller is the only one that is paired to the mobile device 1210, it may automatically operate in the master mode. If both the first hardware gaming controller 1202 and the second hardware gaming controller 1204 are paired to the mobile device 1210, the first of the hardware gaming controllers to connect to, in other words, establish communication with, the mobile device 1210, operates in the master mode. If both the first hardware gaming controller 1202 and the second hardware gaming controller 1204 are paired to, as well as connected to, the mobile device 1210, the first of the hardware gaming controllers to connect to the mobile device 1210, operates in the master mode. Once one of the hardware gaming controllers operates in the master mode, it may send an advertising message, or a poll message to the other hardware gaming controller. In response to receiving the advertising message or the poll message, the other hardware controller may operate in the slave mode. The assignment of the role of master/slave may be dynamic. The functionality of the hardware gaming controllers in terms of generating their respective controller inputs may be independent of the assignment of the master/slave roles.

Figure 13:
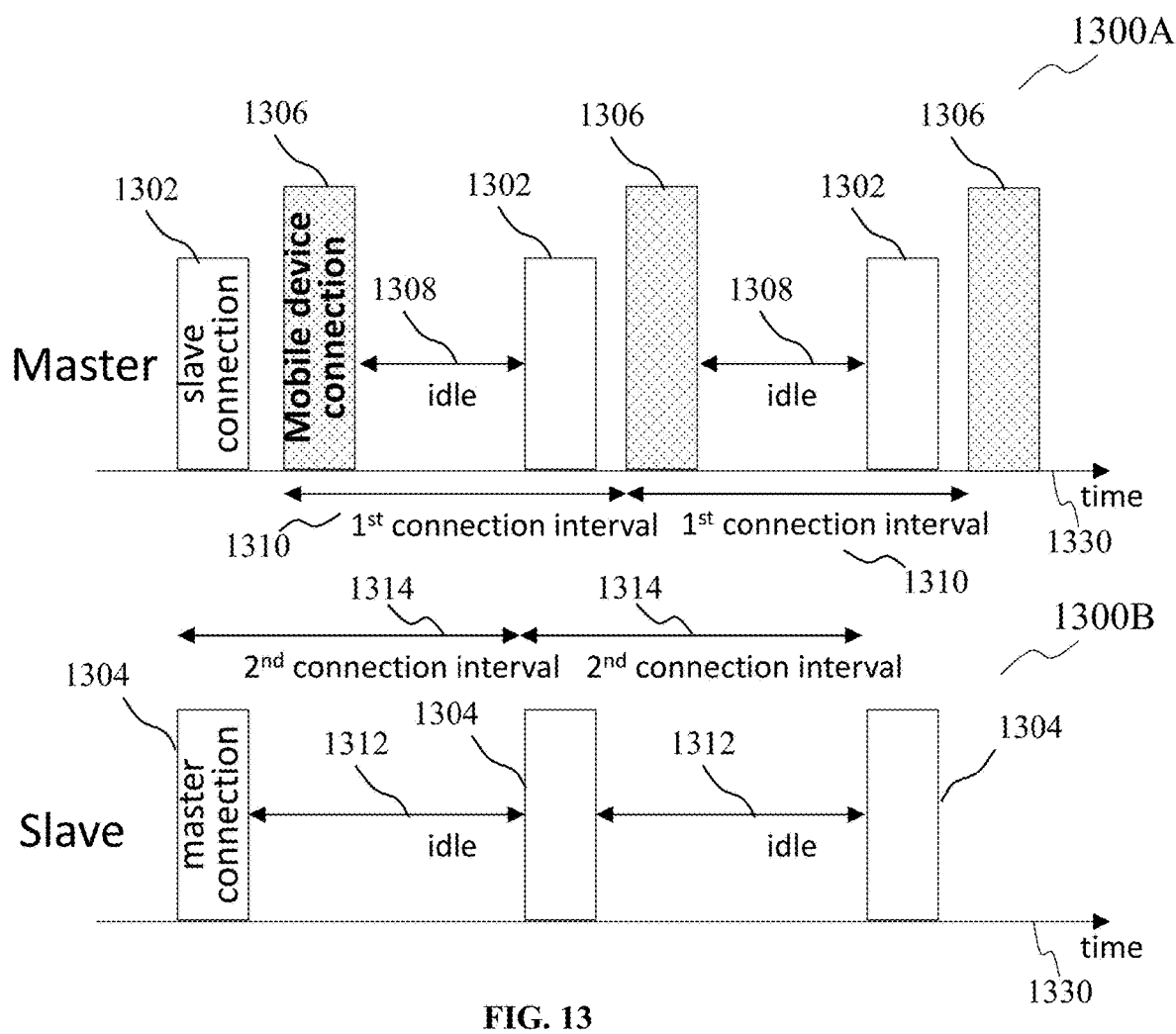
FIG. 13 shows an activity diagram of the master game controller and an activity diagram of the slave game controller according to various embodiments.

FIG. 13 shows an activity diagram 1300A of the master game controller and an activity diagram 1300B of the slave game controller. The activity diagrams 1300A and 1300B have a time axis 1330. At a first time instance, the master game controller may transmit a slave connection signal 1302. At around the same time, the slave game controller may also transmit a master connection signal 1304. Upon receipt of the slave connection signal 1302 by the slave game controller, and receipt of the master connection signal 1304 by the master game controller, the master and slave game controllers may establish a communication channel. The master connection signal 1304 may include a controller input generated by the slave game controller. After the master and slave game controllers have established a communication channel, the master game controller may transmit a mobile device connection signal 1306 to establish a communication channel with the mobile device. The mobile device connection signal 1306 may include a single controller input representation generated by the master game controller. The master game controller may transmit another slave connection signal 1302 after a first idle period 1308. The first idle period 1308 may be measured from the end of the mobile phone connection signal 1306 to the start of a next slave connection signal 1302. The time duration between the transmission of the mobile device connection signal 1306 and the transmission of the next mobile phone connection signal 1306 may be a first connection interval 1310. The first connection interval 1310 may be a time period of the master game controller's communication with the mobile device 1210. The first connection interval 1310 may be measured from the start of the mobile phone connection signal 1306 to the start of the next mobile phone connection signal 1306. The slave game controller may transmit another master connection signal 1304 after a second idle period 1312. The second idle period 1312 may be measured from an end of a master connection signal 1304 to the start of the next master connection signal 1304. The time duration between two successive master connection signals 1304 may be a second connection interval 1314. The second connection interval 1314 may be measured from the start of a master connection signal 1304 to the start of the next master connection signal 1304. The second connection interval 1314 may be a time period of the slave game controller's communication with the master game controller.

Figure 14:
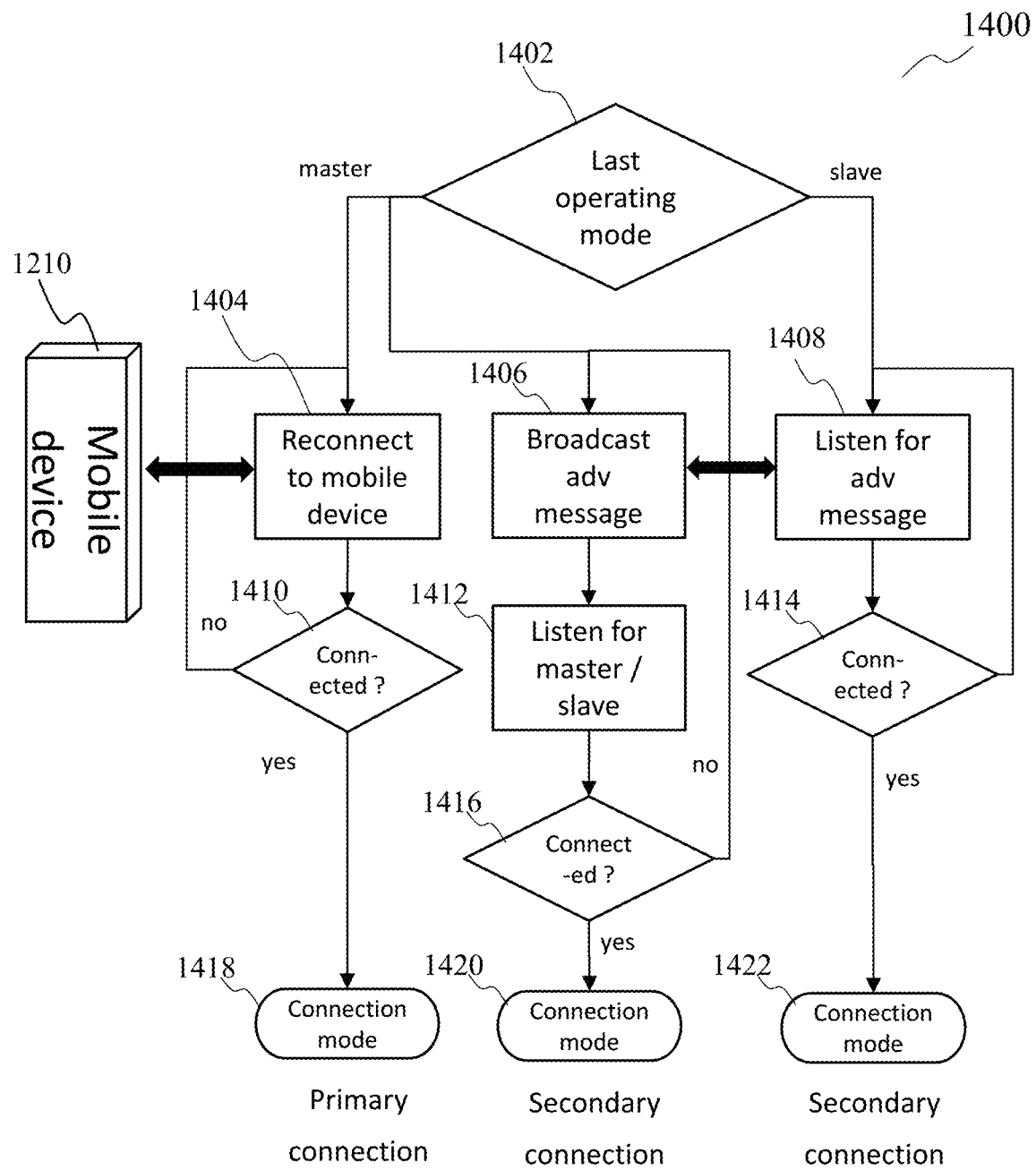
FIG. 14 shows a flowchart of a reconnection mode of the game controller according to various embodiments.

FIG. 14 shows a flowchart 1400 of a reconnection mode of the game controller 1200 according to various embodiments. Each of the first hardware gaming controller 1202 and the second hardware gaming controller 1204 may be configured to execute the process shown in the flowchart 1400. In 1402, the hardware gaming controller may determine its last operating mode. The hardware gaming controller may include a memory that stores information on its last operating mode. If the last operating mode is master game controller, in 1404, the hardware gaming controller may reconnect to the mobile device 1210. The hardware gaming controller may attempt to operate as a master game controller. Next, in 1410, the hardware gaming controller may determine if it has established wireless connection with the mobile device 1210. If the hardware gaming controller has already established wireless connection with the mobile device 1210, it may proceed to connection mode in 1418 where it has established a primary connection with the mobile device 1210. In 1418, the hardware gaming controller has connected with the mobile device 1210 as a master game controller. If the hardware gaming controller is unable to reconnect to the mobile device 1210, it may repeat 1404, i.e. attempt to reconnect to the mobile device 1210 again. While reconnecting to the mobile device in 1404, the hardware gaming controller may also broadcast an advertising message in 1406. The objective of the advertising message may be to initiate communication with the other hardware gaming controller. Next, in 1412, the hardware gaming controller may listen for a reply message from the other hardware gaming controller, in order to establish communication with the other hardware gaming controller. Next, in 1416, the hardware gaming controller may determine if it has connected with the other gaming controller. If it has connected with the other gaming controller, it may proceed to 1420 where it has established a secondary connection with the other hardware gaming controller. If not, the hardware gaming controller may repeat the broadcasting of the advertising message in 1406.

Alternatively, if in 1402, the hardware gaming controller determines that its last operating mode was a slave game controller, the hardware gaming controller may proceed to 1408, to listen for an advertising message from the master game controller. Next, in 1414, the hardware gaming controller may determine if it has connected with the master game controller. If yes, the hardware gaming controller may proceed to 1422 where it has established a secondary connection with the other hardware gaming controller.

Figure 15:
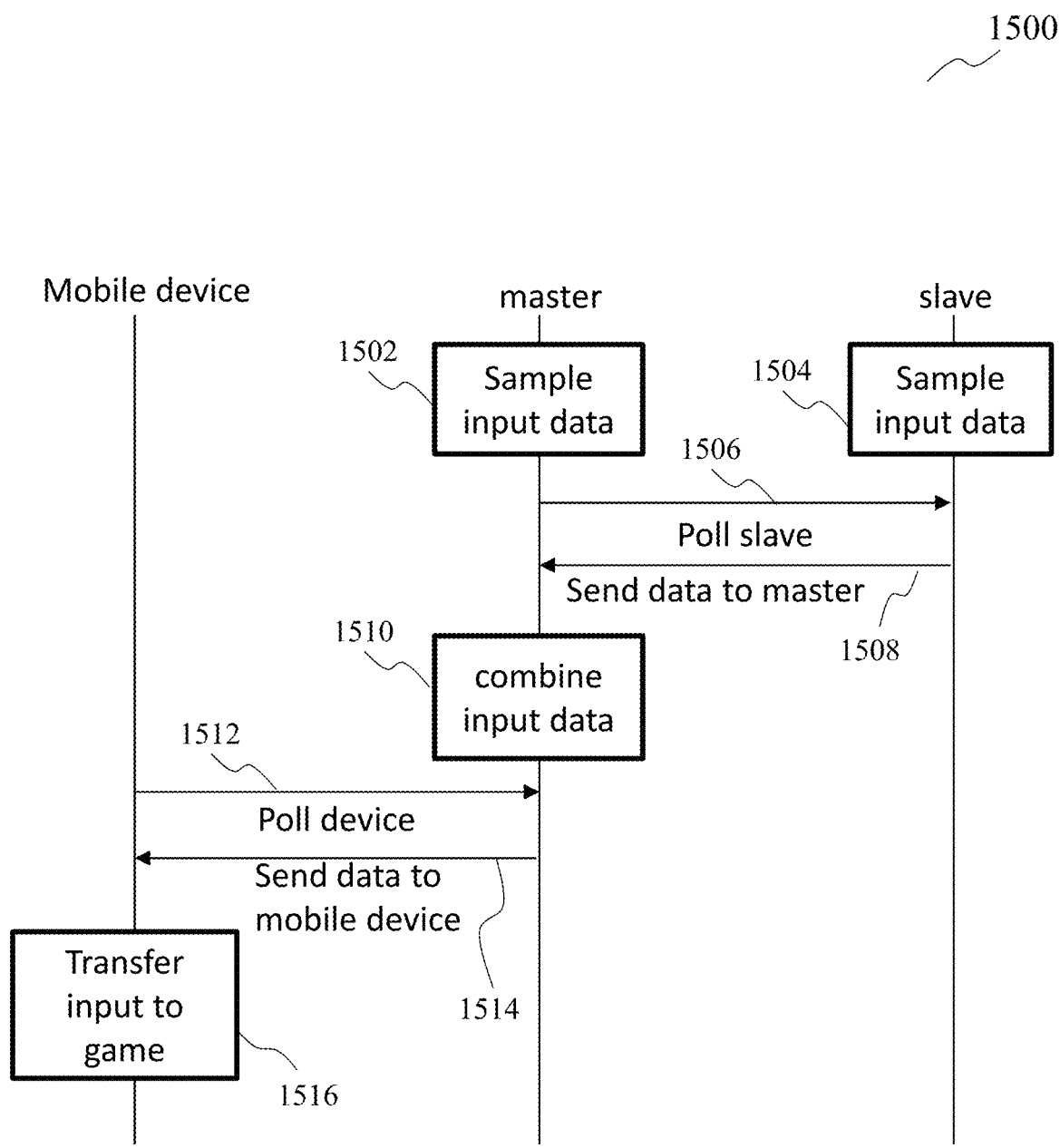
FIG. 15 shows a connection diagram of the game controller according to various embodiments.

FIG. 15 shows a connection diagram 1500 of the game controller 1200 according to various embodiments. After each hardware gaming controller of the game controller 1200 has entered their respective operating modes, the master game controller may sample input data in 1502 and the slave game controller may sample input data in 1504. In sampling input data, each hardware gaming controller may translate the user inputs into a controller input data. In 1506, the master game controller may poll the slave game controller for its controller input data. In 1508, the slave game controller may send its controller input data to the master game controller, in response to the polling. In 1510, the master game controller may combine the controller input data of the slave game controller, with its own controller input data. In 1512, the mobile device 1210 may poll the game controller 1200 for user inputs to an application that is running on the mobile device 1210. In response to the polling in 1512, the master game controller may send the combined controller input data to the mobile device in 1514. In 1516, the mobile device 1210 transfers to the received combined controller input data to the application, for example a game application.

Figure 16:
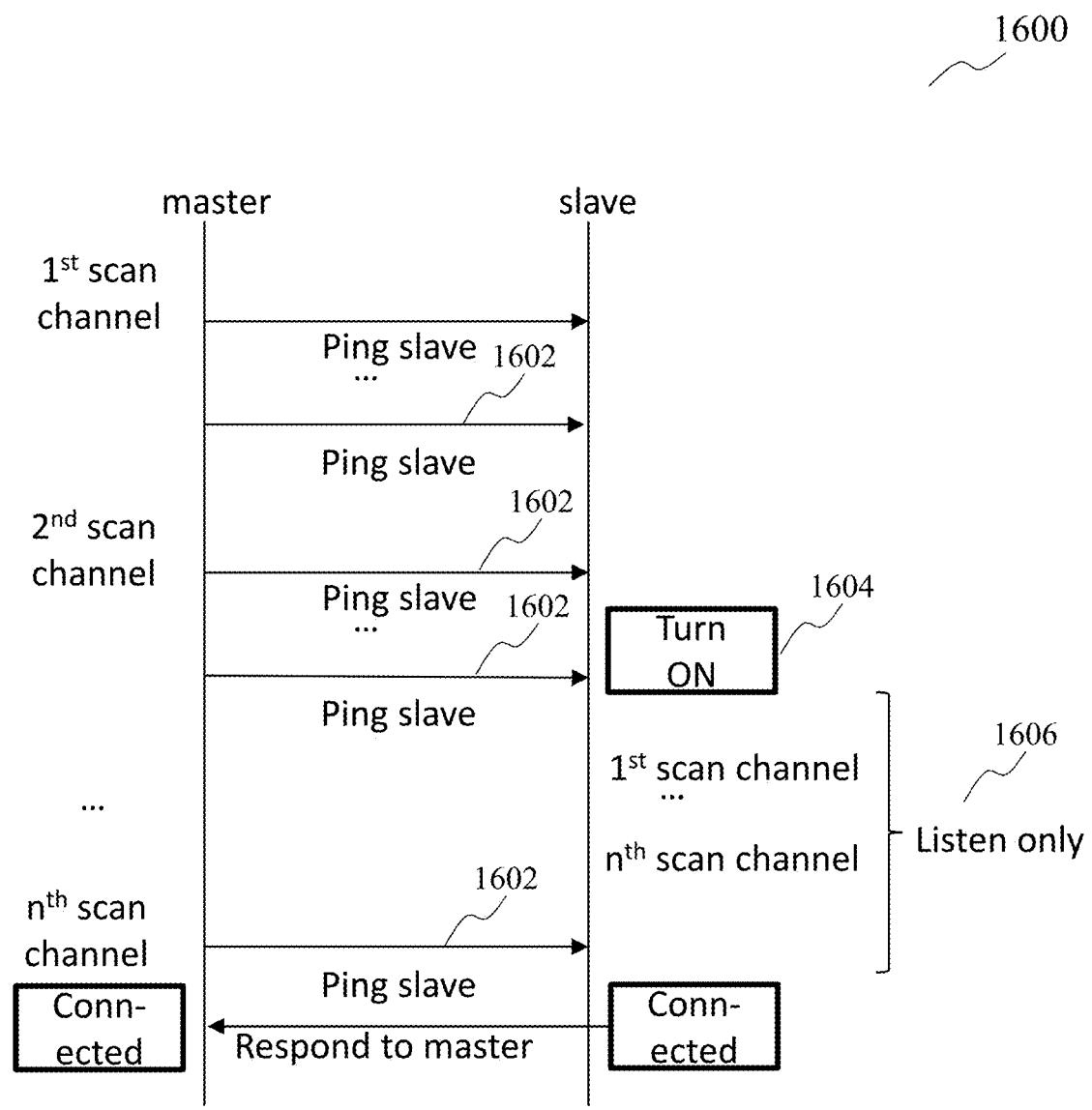
FIG. 16 shows a connection diagram of the game controller performing a master and slave connection process according to various embodiments.

FIG. 16 shows a connection diagram 1600 of the game controller 1200 performing a master and slave connection process according to various embodiments. After each hardware gaming controller of the game controller 1200 has entered their respective operating modes, the master game controller may attempt to connect with the slave game controller. In 1602, the master game controller may ping the slave game controller, in other words, send a query to the slave game controller. The master game controller may repeatedly send the ping/query messages via a plurality of scan channels, until it receives a reply from the slave game controller. Meanwhile, the slave game controller may listen for the query message from the master game controller as soon as it is switched on in 1604. In 1606, the slave game controller may listen for the query message across the plurality of scan channels. Upon receiving the query message from the master game controller, the slave game controller may respond to the query message in 1608. After the slave game controller responds to the query message, both the master and slave game controllers may determine that they are connected to one another. If however, the slave game controller does not receive any query message from the master game controller after listening for a predetermined time duration, the slave game controller may initiate connection with the mobile device 1210 and may change its role to operate as master game controller.

Figure 17:
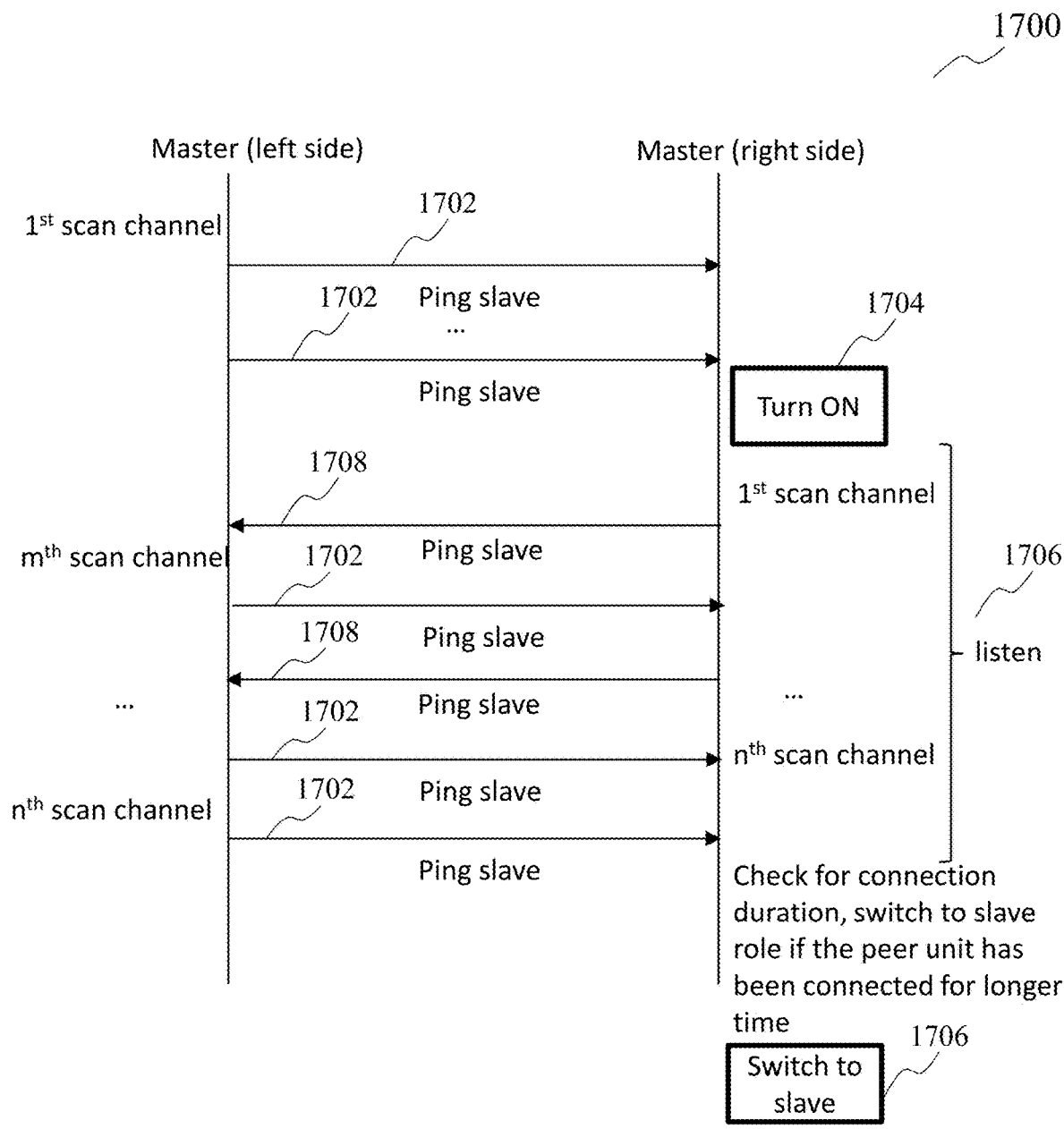
FIG. 17 shows a connection diagram of the game controller performing a master and slave connection process according to various embodiments.

FIG. 17 shows a connection diagram 1700 of the game controller 1200 performing a master and slave connection process according to various embodiments. The connection diagram 1700 shows the connection process, when both the hardware gaming controllers are operating in the master mode. This situation may occur, if both hardware gaming controllers determine that their last known operation modes are master mode, or if they both determine that they are connected to the mobile device 1210. In the example shown, the left hardware gaming controller is connected to the mobile device 1210 earlier than the right hardware gaming controller. In 1702, the left hardware gaming controller may ping the right hardware gaming controller across a plurality of scan channels. Similarly, after turning on in 1704, the right hardware gaming controller may ping the left hardware gaming controller across the plurality of scan channels in 1708. The ping messages sent in 1702 and 1708 may include connection duration of the respective hardware gaming controllers, in other words, the time duration that the hardware gaming controllers have been connected to the mobile device 1210. In 1706, the right hardware gaming controller may listen for messages from the left hardware gaming controller in parallel to pinging the left hardware gaming controller. Upon receiving the ping message from the left hardware gaming controller, the right hardware gaming controller may determine that the left hardware gaming controller has been connected to the mobile device 1210 for a longer time than itself, and may then switch to operating in the slave mode in 1706.

Figure 18A:
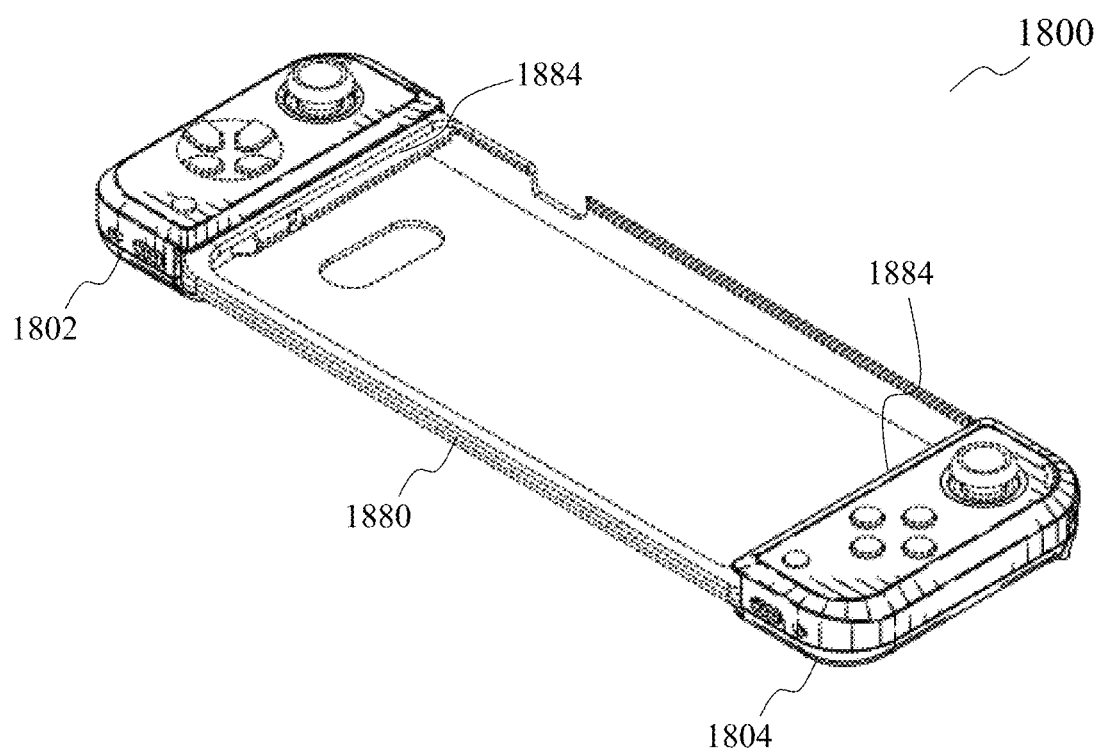
FIG. 18A shows a perspective view of a gaming controller according to various embodiments.

FIG. 18A shows a perspective view of a gaming controller 1800 according to various embodiments. The gaming controller 1800 may be the gaming controller 1200. The gaming controller 1800 may include a first hardware gaming controller 1802 which may be identical, or similar to the first hardware gaming controller 1202. The gaming controller 1800 may also include a second hardware gaming controller 1804 which may be identical, or similar to the second hardware gaming controller 1204. The gaming controller 1800 may be coupleable to a housing 1880 of a mobile device.

The housing 1880 may be shaped to receive the mobile device. The housing 1880 may wrap around the mobile device, exposing only a front surface of the mobile device which includes a screen of the mobile device. The housing 1880 may serve as a protective casing for the mobile device, as well as a means for the gaming controller 1800 to be affixed to the mobile device. The gaming controller 1800 may include the housing 1880. Alternatively, the housing 1880 may be part of the mobile device. The housing 1880 may allow the gaming controller 1800 to be attached to a mobile device even if the mobile device is not specifically designed to be coupleable to the gaming controller. Therefore, by fitting the housing 1880 over the mobile device, the mobile device is transformed into a complementary device to the game controller 1800.

Figure 18B:
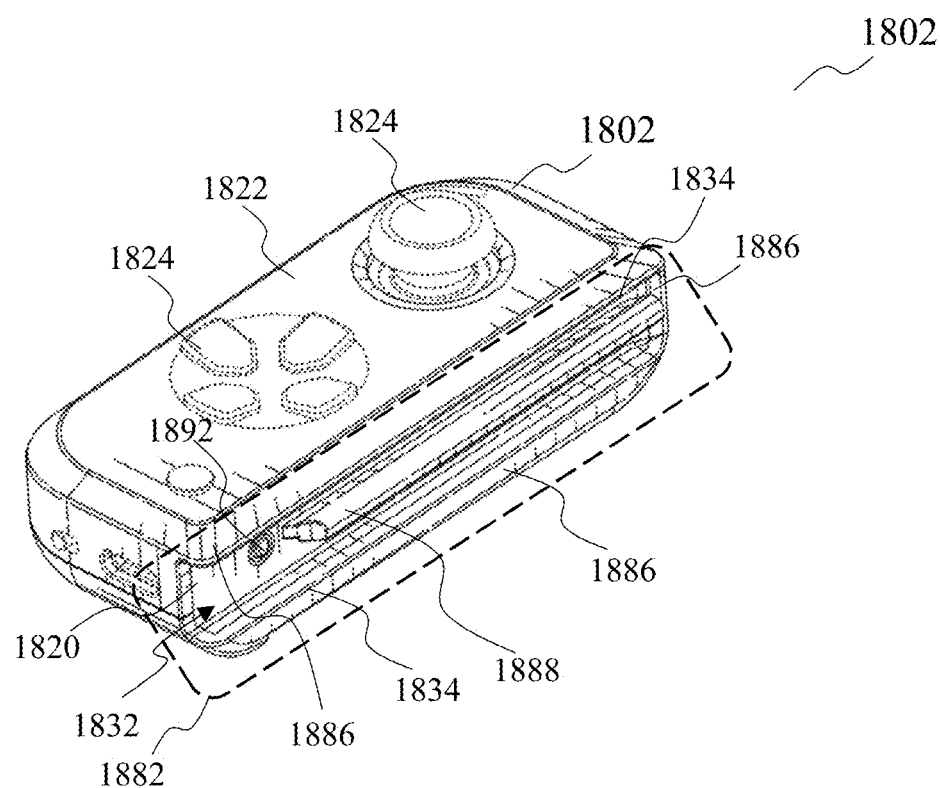
FIG. 18B shows a perspective view of the first hardware gaming controller according to various embodiments.
Figure 18C:
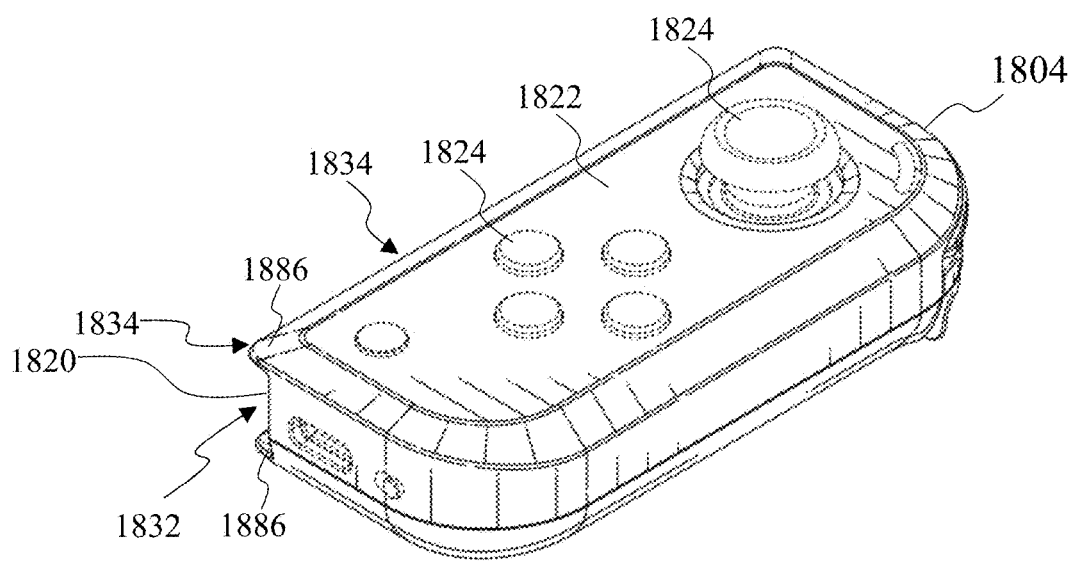
FIG. 18C shows a perspective view of the second hardware gaming controller 1802 according to various embodiments.

FIG. 18B shows a perspective view 1800B of the first hardware gaming controller 1802 according to various embodiments. FIG. 18C shows a perspective view 1800C of the second hardware gaming controller 1802 according to various embodiments. Each of the first hardware gaming controller 1802 and the second hardware gaming controller 1804 may include a coupling member 1882. The coupling member 1882 of each hardware gaming controller may be shaped to slidably engage a respective side portion 1884 of the housing 1880. The coupling member 1882 may include a raised edge structure 1886 that fits around the side portion 1884 of the housing 1880 in a socket-like manner. The raised edge structure 1886 may have a gap 1832 at one end/side in a manner such that the raised edge structure 1886 forms a guide member having a slot for slidably receiving the side portion 1884 of the housing 1880. The coupling member 1882 may include an elongate member 1888 that is shaped to snugly fit into a groove 1890 at the side portion 1884. The elongate member 1888 may be parallel to the slot enclosed by the raised edge structure 1886. The elongate member 1888 may serve as a guiding rib for sliding engagement with the groove 1890.

The elongate member 1888 may extend out of or protrude from an elongate surface 1820 (or a side surface) of the hardware gaming controller 1802, 1804. The elongate surface 1820 may be at least substantially perpendicular to a control surface 1822 of the hardware gaming controller 1802, 1804, whereby the elongate surface 1820 is parallel to an edge of the control surface 1822. The buttons 1824 of the hardware gaming controller 1802, 1804, which may be operated by a user to generate a user input, may be provided on the control surface 1822. The elongate member 1888 may extend or protrude perpendicularly out of the elongate surface 1820, i.e. forms a right angle with the elongate surface 1820. The raised edge structure 1886 may border the elongate surface 1820 and may extend or protrude perpendicularly out of the elongate surface 1820, i.e. forms a right angle with the elongate surface 1820. The elongate member 1888 may have an asymmetrical transverse cross-section which may ensure that the hardware gaming controller can be coupled to the housing 1880 only in one orientation with respect to the housing 1880. In other words, the hardware gaming controller may be coupled to the housing 1880 only the right way up, such that the buttons 1824 on the hardware gaming controller 1802, 1804 and the screen of the mobile device fitted into the housing 1880 face the same direction, i.e. face the user.

Figure 19A:
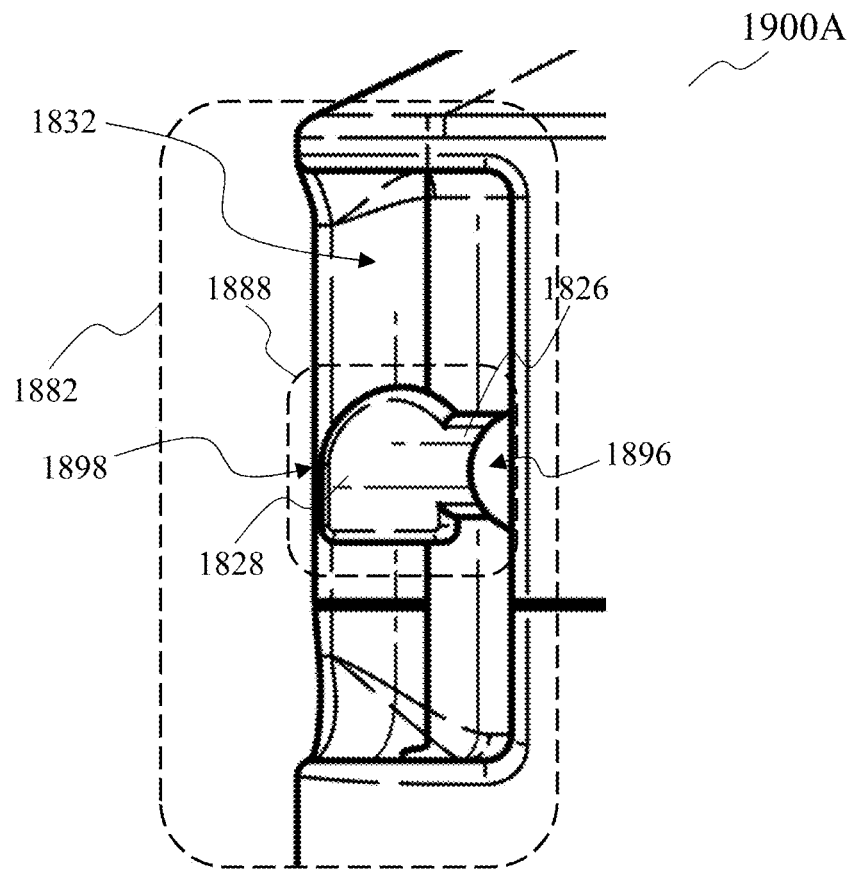
FIG. 19A shows a side view of the coupling member according to various embodiments.

FIG. 19A shows a side view 1900A of the coupling member 1882 according to various embodiments. The elongate member 1888 may include a stem portion 1826 and an engagement portion 1828. The elongate member 1888 may be formed as a whole, single structure. In other words, the stem portion 1826 and the engagement portion 1828 may be formed integrally. The elongate member 1888 may have a first longitudinal edge 1896 extending lengthwise and an opposite second longitudinal edge 1898 extending lengthwise. The elongate member 1888 may be attached to the elongate surface 1820 of the coupling member 1882 longitudinally at the first longitudinal edge 1896. Accordingly, the elongate member 1888 may be parallel to the elongate surface 1820 and the first longitudinal edge 1896 of the elongate member 1888 may be joined to the elongate surface 1820 along a length of the elongate surface 1820. The first longitudinal edge 1896 may be part of the stem portion 1826. The second longitudinal edge 1898 may be a free longitudinal edge of the elongate member 1888. The second longitudinal edge 1898 may be part of the engagement portion 1828. The engagement portion 1828 may be coupled to the elongate surface 1820 via the stem portion 1826. The stem portion 1826 may be narrower than the engagement portion 1828. The engagement portion 1828 may be shaped to snugly fit into the groove 1890 of the housing 1880, i.e. the engagement portion 1828 and the groove 1890 may be complementarily shaped.

Figure 19B:
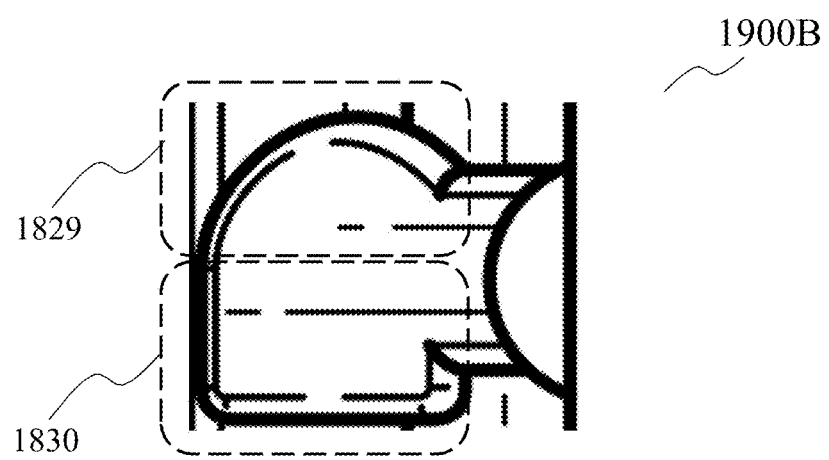
FIG. 19B shows a side view of the elongate member according to various embodiments.

FIG. 19B shows a side view 1900B of the elongate member 1888 according to various embodiments. The engagement portion 1828 may have an asymmetrical transverse cross-section. A top profile 1829 (or a first half) and an opposite bottom profile 1830 (or a second half) of the cross-section of the engagement portion 1828 may have differently shapes. The top profile 1829 may be directed in a facing direction of the control surface 1822. The top profile 1829 may face the user when the user is holding the hardware gaming controller to operate the buttons 1824 on the control surface 1822, albeit hidden from view within the groove 1890 when the hardware gaming controller 1802, 1804 is coupled to the housing 1880. The top profile 1829 may be rounded and curves outwards. The top profile 1829 may have a convex shape. The bottom profile 1830 may be planar or flat.

A lateral width of the elongate member 1888 (i.e. measured perpendicularly from the first longitudinal edge of the elongate member 1888 to the second longitudinal edge of the elongate member 1888) may be less than, or equal to an elevation of the raised edge structure 1886 (i.e. a height of the raised edge structure measured from the elongate surface 1820 of the hardware gaming controller 1802, 1804 to a rim 1834 of the raised edge structure 1886) such that the elongate member 1888 does not extend or protrude beyond a plane that spans across the rim 1834 of the raised edge structure 1886. In other words, the second longitudinal edge of the elongate member 1888 may be recessed relative to the rim 1834 of the raised edge structure 1886, or may be levelled with the rim 1834 of the raised edge structure 1886. When the control surface 1822 of the hardware gaming controller 1802, 1804 is directly facing a user, the elongate member 1888 may not be visible to the user as it may be hidden in view by the raised edge structure 1886.

Figure 19C:
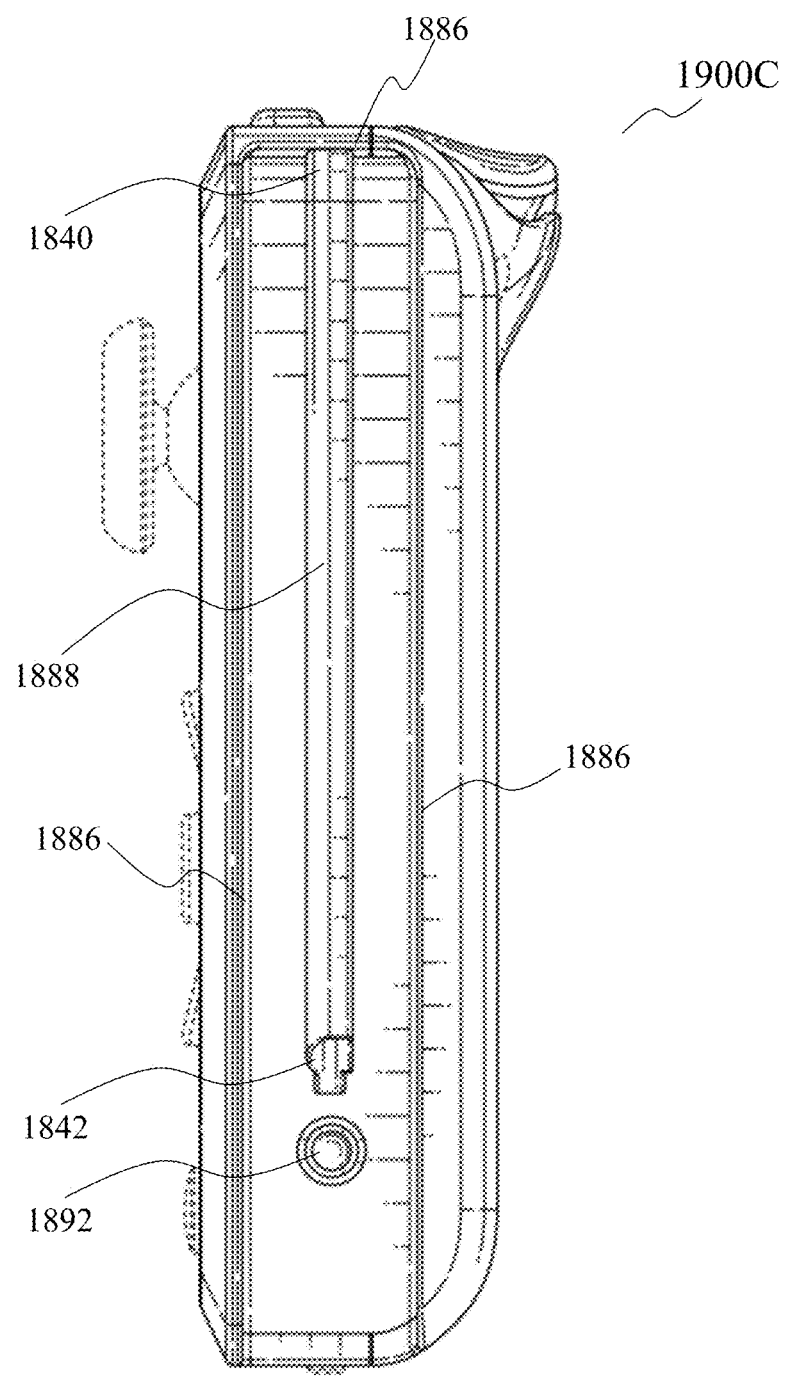
FIG. 19C shows a side view of the hardware gaming controller according to various embodiments

FIG. 19C shows a side view 1900C of the hardware gaming controller according to various embodiments. The elongate member 1888 has a first terminal end 1840 (or a rear end) and an opposite second terminal end 1842 (or a front end). The first terminal end 1840 may be connected to the raised edge 1886. The second terminal end may taper off from the elongate surface 1820 such that it has an inclined surface relative to the elongate surface 1820. The first terminal end 1840 may face the gap 1832 in the raised edge 1886. The second longitudinal edge 1898 of the elongate member 1888 may be shorter than the first longitudinal edge 1896.

Each of the first hardware gaming controller 1802 and the second hardware gaming controller 1804 may include a stopper 1892. The stopper 1892 may be retractable into the hardware gaming controller. The stopper 1892 may be biased outwards of the hardware controller. The stopper 1892 may be arranged to fit into a corresponding indentation 1894 at the side portion 1884 when the side portion 1884 is received in the coupling member 1882 such that the hardware controller is biased against sliding with respect to the housing 1880. The stopper 1892 may be provided nearer to the second terminal end 1842 than to the first terminal end 1840.

Figure 20A:
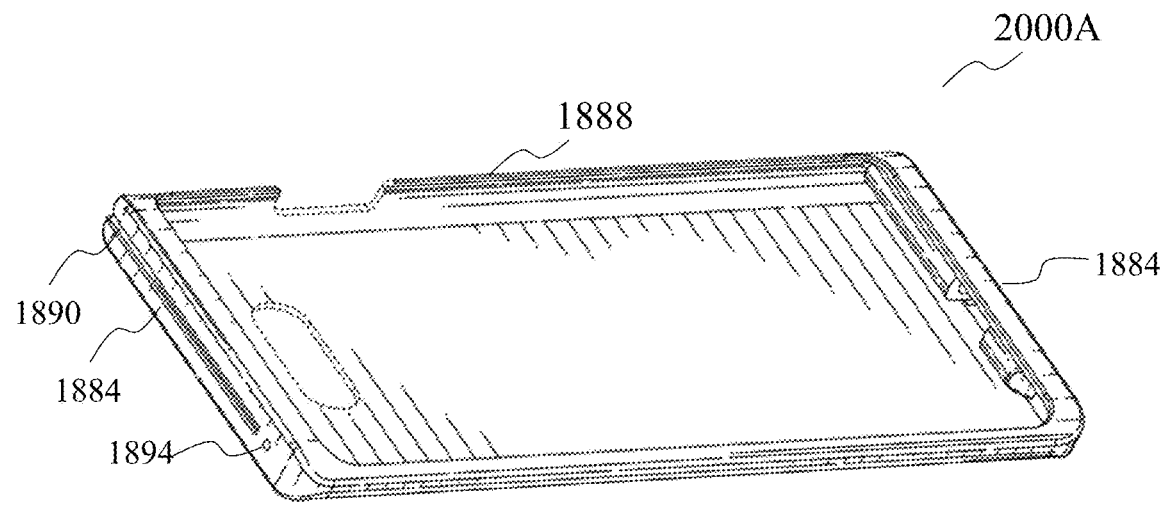
FIG. 20A shows a perspective view of the housing according to various embodiments.

FIG. 20A shows a perspective view 2000A of the housing 1888 according to various embodiments.

Figure 20B:
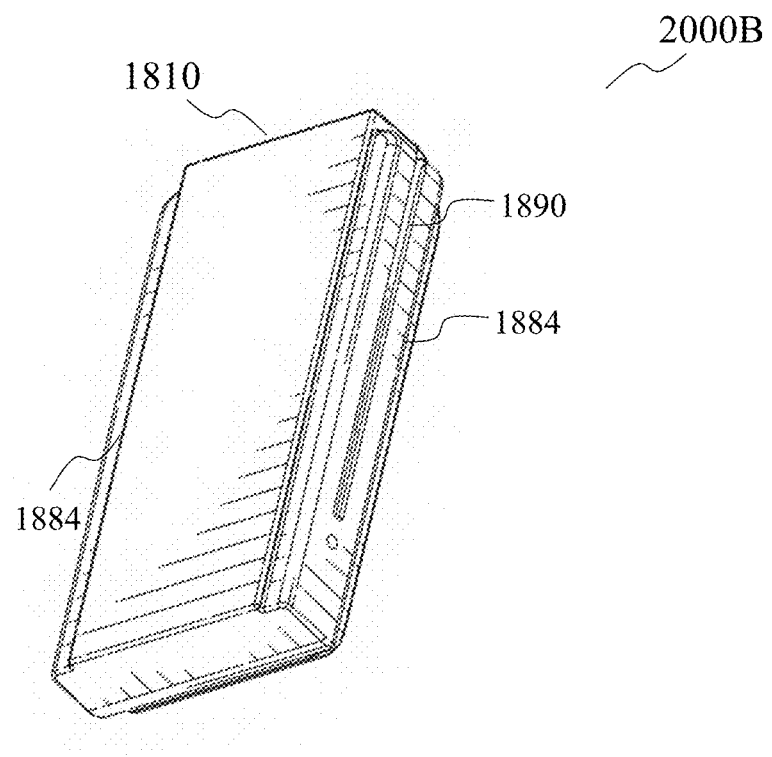
FIG. 20B shows a perspective view of the spacer according to various embodiments.

According to various embodiments, the gaming controller 1800 may include a spacer 1810. FIG. 20B shows a perspective view 2000B of the spacer 1810 according to various embodiments. The spacer 1810 may have opposing side portions 1884, just like the housing 1880. Each side portions 1884 of the spacer may also include a groove 1890. The spacer 1810 may be coupleable to the hardware gaming controllers, just like the housing 1880. Unlike the housing 1880, the spacer 1810 may exclude any cavity for receiving the mobile device. The spacer 1810 may serve to mechanically secure the first hardware gaming controller 1802 on a left side and mechanically secure the second hardware gaming controller 1804 on a right side, to form a gaming controller that is similar in form and shape, to a conventional gaming controller.

Figure 20C:
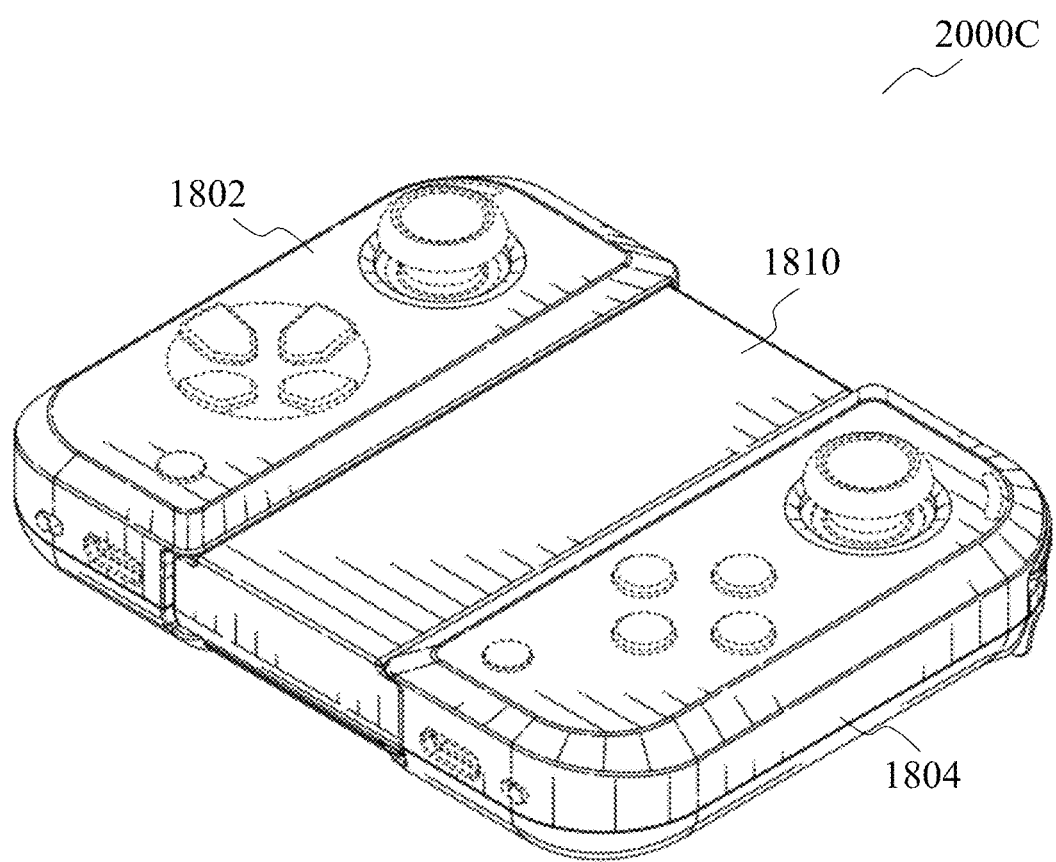
FIG. 20C shows a perspective view of the gaming controller coupled to the spacer.

FIG. 20C shows a perspective view 2000C of the gaming controller 1800 coupled to the spacer 1810.

According to various embodiments, the first hardware gaming controller 1802 and the second hardware gaming controller 1804 may be operated by a user while being detached from the housing 1880. The gaming controller 1800 need not be physically attached to the housing 1880 while being operated to provide controller inputs to the mobile device, but may need to be within a communication range of their respective transceivers.

According to various embodiments, the gaming controller 1800 may be operable using either both, or only one of the hardware gaming controllers. The gaming controller 1800 may allow both single-sided and double-sided controller gameplay. Each of the first hardware gaming controller 1802 and the second hardware gaming controller 1804 may include a battery that supplies electrical energy to the hardware gaming controller. The battery may be chargeable, for example, via a USB port on the hardware gaming controller. The battery may be able to hold electrical power sufficient for up to 100 hours of usage, from a single charge. As the gaming controller 1800 connects to the mobile device via a wireless connection, it need not take up any of the mobile device's physical electrical ports. Therefore, the mobile device may be charged via its physical electrical port, while the gaming controller 1800 is operated to provide controller inputs to the mobile device. This may allow the mobile device to be used for running gaming applications for an extended time.

According to various embodiments, each of the first hardware gaming controller 1802 and the second hardware gaming controller 1804 may include a power switch. The hardware gaming controllers may be switched on and off using the power switch. The ability to switch off the hardware gaming controllers allow energy conservation when the hardware gaming controllers are not in use, and also avoid accidental transmission of controller inputs when a user is not using the mobile device.

Figure 21:
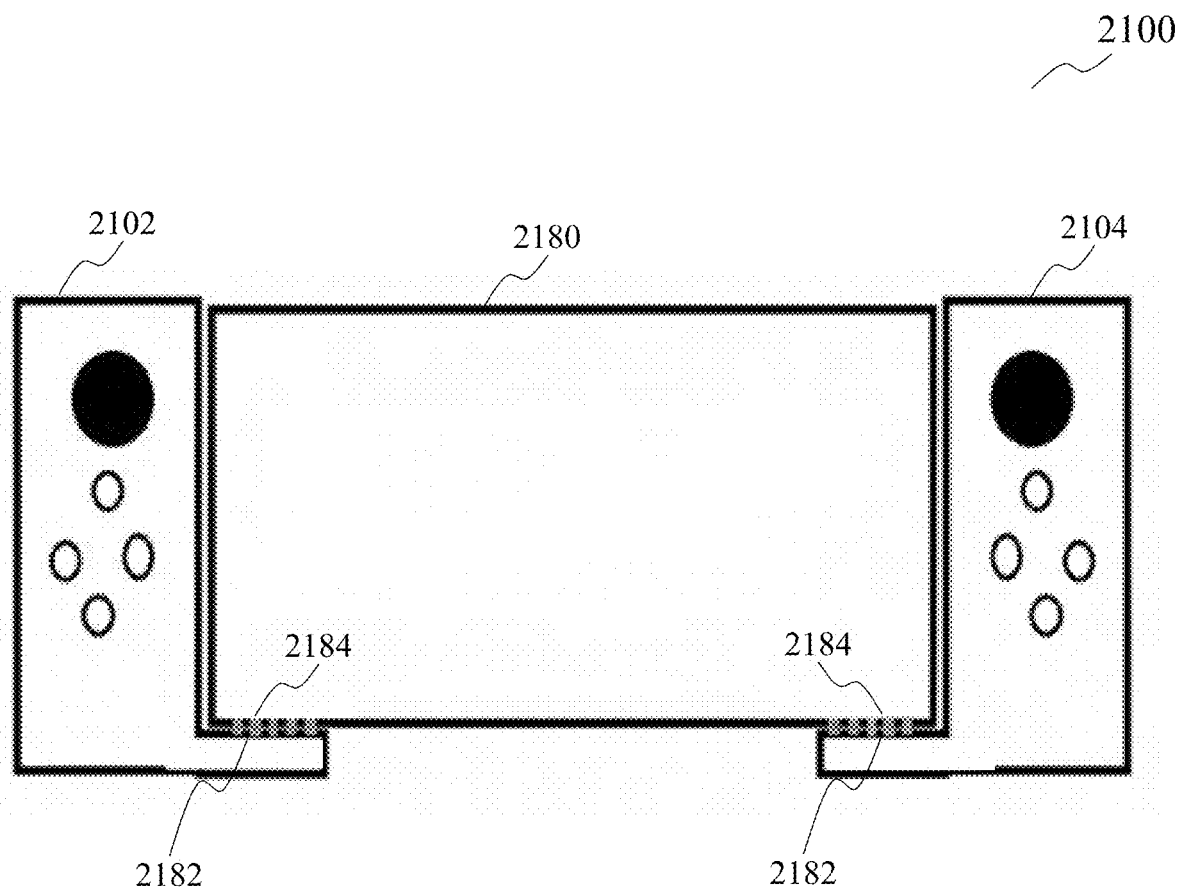
FIG. 21 shows a gaming controller according to various embodiments.

FIG. 21 shows a gaming controller 2100 according to various embodiments. The gaming controller 2100 may be similar to the gaming controller 1200 or the gaming controller 1800 in that it may include a first hardware gaming controller 2102 and a second hardware gaming controller 2104. Both the first hardware gaming controller 2102 and the second hardware gaming controller 2104 may communicate directly with the mobile device. In addition, or alternative to the master mode and the slave mode, the first hardware gaming controller 2102 and the second hardware gaming controller 2104 may operate in a direct communication mode. In the direct communication mode, each of the first hardware gaming controller 2102 and the second hardware gaming controller 2104 may establish wireless communication with the mobile device. The first hardware gaming controller 2102 may transmit the left controller input to the mobile device via its direct wireless communication with the mobile device. Similarly, the second hardware gaming controller 2104 may transmit the right controller input to the mobile device via its direct wireless communication with the mobile device. The gaming controller 2100 may transmit the left controller input and the right controller input as separate data packets to the mobile device.

According to various embodiments, the gaming controller 2100 may communicate with the mobile device through wired communication in addition to, or as an alternative to, the wireless communication. To facilitate the wired communication with the mobile device, each of the first hardware gaming controller 2102 and the second hardware gaming controller 2104 may include communication pins 2182 on a surface of the hardware gaming controller that comes into contact with a housing 2180. The communication pins 2182 may be provided on the coupling members of the hardware gaming controllers. The communication pins 2182 may be provided on the bottom sidewalls of the hardware gaming controllers. The housing 2180 which may be shaped to wrap around the mobile device, may include electrical contacts 2184 for coupling with the communication pins. The electrical contacts 2184 may be provided on side portions of the housing 2180, or on the back surface of the housing 2180.

Figure 22:
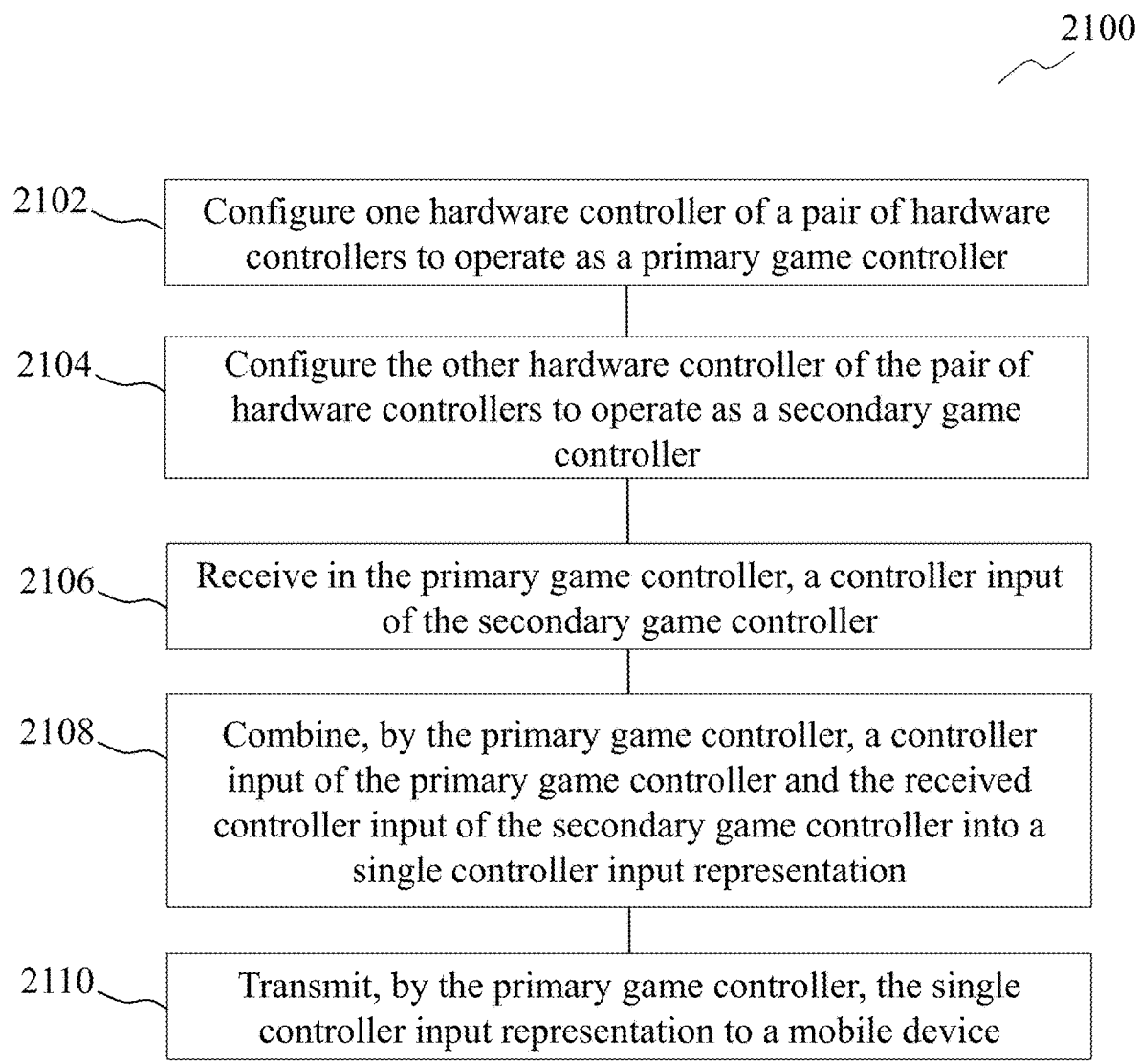
FIG. 22 shows a flow diagram of a method of operating a gaming controller according to various embodiments.

FIG. 22 shows a flow diagram 2200 of a method of operating a gaming controller according to various embodiments. The gaming controller may be the gaming controller 1200 or 1800. The pair of hardware controllers may include the first hardware gaming controller 1202 or 1802 and the second hardware gaming controller 1204 or 1804. The method may include configuring one hardware controller of the pair of hardware controllers to operate as a primary game controller, in 2202. The method may further include configuring the other hardware controller of the pair of hardware controllers to operate as a secondary game controller, in 2204. The method may further include receiving in the primary game controller, a controller input of the secondary game controller, in 2206. The method may further include combining, by the primary game controller, a controller input of the primary game controller and the received controller input of the secondary game controller into a single controller input representation, in 2208. The method may further include transmitting, by the primary game controller, the single controller input representation to a mobile device, in 2210. The primary game controller may transmit the single controller input representation to the mobile device using a first wireless protocol, and wherein the secondary game controller transmits its controller input to the primary game controller using a second wireless protocol. The first wireless protocol may be Bluetooth while the second wireless protocol may be WiFi. The WiFi connection may have a frequency of 2.4 GHz. The method may further include pinging the secondary game controller by the primary game controller, to establish wireless data coupling between the primary game controller and the secondary game controller. The wireless data coupling may be one of a Bluetooth connection, a WiFi connection, a Wireless Universal Serial Bus (WUSB) connection, a radio frequency connection, or an infrared data connection.

According to various embodiments, in configuring one of the hardware controllers to operate as the primary game controller, each hardware controller may determine as to whether it established wireless data coupling with the mobile device before the other hardware controller. In response to determining that it has established wireless data coupling with the mobile device before the other one of the hardware controllers, the hardware controller may configure itself to operate as the primary game controller.

According to various embodiments, in configuring one of the hardware controllers to operate as the primary game controller, each hardware controller may determine its last known operation mode. The last known operation mode is one of primary game controller and secondary game controller. One of the hardware controllers may configure itself to operate as the primary game controller in response to determining that its last known operation mode was a primary game controller. Each of the first hardware gaming controller and the second hardware gaming controller may include a memory that stores information on its last known operation mode. Each of the first hardware gaming controller and the second hardware gaming controller may be configured to initialize operation in its respective last known operation mode.

In the following, an example of a method of pairing the hardware controllers is described.

A user may operate the hardware controllers to enter a controller pairing mode, for example, using a frequency of 2.4 GHz. To enter the controller pairing mode on the first hardware gaming controller, the user may hold a predefined button or predefined combination of buttons on the first hardware gaming controller before toggling its power switch to ON position. To enter the controller pairing mode on the second hardware gaming controller, the user may hold another predefined button or another predefined combination of buttons on the second hardware gaming controller before toggling its power switch to ON position. When both the first hardware gaming controller and the second hardware gaming controller are in the controller pairing mode, they may be paired and the first to enter the controller pairing mode may become the master game controller until the next instance of power on.

In the event that the hardware controllers are off, a user may switch the pair of hardware controllers to ON state, to enter a 2.4 GHz reconnection mode. The user may then operate the pair of hardware controllers to enter the controller pairing mode as described above. The hardware controllers may include an indicator light that shows different colors depending on a charging state of the battery.

In the event that the hardware controllers are already in the reconnection mode, if the reconnection is successful, one of the hardware controllers may enter a master operating mode, i.e. function as the primary game controller. The other hardware controller may enter a slave operating mode, i.e. function as the secondary game controller. The hardware controller that is turned on earlier than the other hardware controller may assume the role of the primary game controller. The primary game controller may enter a pairing mode with the mobile device, while the secondary game controller may be in a controller connected mode with the primary game controller. If the reconnection is unsuccessful, both hardware controllers may enter the pair mode to seek pairing with the mobile device. Alternatively, the user may switch the pair of hardware controllers to OFF state to turn off the gaming controller.

In the event that a hardware controller is in a phone pairing mode, the hardware gaming controller that is connected to the phone may enter a phone connected mode. If the hardware gaming controller is unable to connect to the phone for a predetermined time duration of for example, 60 seconds, the hardware gaming controller may enter a standby mode. Alternatively, the user may switch the hardware controller to OFF state to turn off the gaming controller. The indicator may fast blink in a first color to indicate that the battery level is sufficient, and may fast blink in a second color when the battery level is low.

In the event that a hardware controller is in a phone connected mode, the other hardware controller that is disconnected from the phone may enter the controller pairing mode. If the hardware controller is idle for more than a predetermined time duration, for example, 10 minutes, the controller may enter a standby mode. Before entering the standby mode, the hardware controller may command the other hardware controller to also enter the standby mode. The idle timer may start only when both hardware controllers are idle.

In the event that a hardware controller is in a controller connected mode and is not the primary game controller, it may automatically enter the reconnection mode when it disconnects from the other hardware controller.

In the event that a hardware controller is in a standby mode, a user may trigger the hardware controller to enter the reconnection mode by pressing a predetermined button such as Start/Select for a time duration such as 0.8 seconds.

In the event that a hardware controller is in a controller pairing mode, the hardware controller enters the phone pairing mode if it is turned on earlier than the other hardware controller, or enters the controller connected mode if it is turned on later than the other hardware controller.

According to various embodiments, the controller pairing mode and the reconnection mode may take place on a different frequency from 2.4 GHz.

The following examples pertain to further embodiments.

Example 1 is a gaming controller for a mobile device, including: a first hardware gaming controller including a first programmable controller and at least one input switch, the at least one input switch of the first hardware gaming controller configured to be manipulated by a user's left thumb and/or fingers to generate a left controller input with the first programmable controller; and a second hardware gaming controller including a second programmable controller and at least one input switch, the at least one input switch of the second hardware gaming controller configured to be manipulated by a user's right thumb and/or fingers to generate a right controller input with the second programmable controller; the first hardware gaming controller and the second hardware gaming controller each configured to be removably coupleable with a mobile device, the mobile device including a housing, and a mobile device processor coupled to a memory module and provided with the housing, the mobile device processor configured to run a software application; wherein the first hardware gaming controller is configured to be mechanically secured to a side portion of the housing of the mobile device, and the second hardware gaming controller is configured to be mechanically secured to an opposing side portion of the housing of the mobile device; and wherein the left controller input and the right controller input are combined with a virtual controller module to form a virtual gaming controller with a single controller input representation for providing to the software application.

In example 2, the subject matter of example 1 can optionally include that the first hardware gaming controller includes a serial bus connection coupling the first programmable controller to the mobile device processor and the second hardware gaming controller includes a separate serial bus connection coupling the second programmable controller to the mobile device processor.

In example 3, the subject matter of example 1 or 2 can optionally include where the first hardware gaming controller includes a first wireless transceiver coupled to the first programmable controller and the second hardware gaming controller includes a second wireless transceiver coupled to the second programmable controller, for establishing a wireless data coupling.

In example 4, the subject matter of example 3 can optionally include where the first hardware gaming controller and the second hardware gaming controller are configured to establish separate wireless data couplings to the mobile device processor.

In example 5, the subject matter of example 3 can optionally include where a wireless data coupling is configured to be established between the first programmable controller in the first hardware gaming controller and the second programmable controller in the second hardware gaming controller.

In example 6, the subject matter of example 5 can optionally include where any one of the first hardware gaming controller or the second hardware gaming controller includes a serial bus connection to the mobile device processor.

In example 7, the subject matter of example 5 can optionally include where any one of the first hardware gaming controller or the second hardware gaming controller further establishes a wireless data coupling to the mobile device.

In example 8, the subject matter of any one of examples 3 to 7 can optionally include where the wireless data coupling is any one of a Bluetooth connection, a Wireless Universal Serial Bus (WUSB) connection, a radio frequency connection, or an infrared data connection.

In example 9, the subject matter of any one of examples 1 to 8 can optionally include where the mobile device processor is configured to receive the left controller input and the right controller input as distinct data packets.

In example 10, the subject matter of example 9 can optionally include where wherein an operating system running on the mobile device processor is configured to receive the left controller input and the right controller input as distinct data packets; and where the virtual controller module is configured for operation on the operating system.

In example 11, the subject matter of any one of examples 9 or 10 can optionally include where a device driver running on the mobile device processor is configured to receive the left controller input and the right controller input as distinct data packets by, for interpreting the data packets for communication with the operating system.

In example 12, the subject matter of any one of examples 1 to 11 can optionally include a data coupling between the first programmable controller in the first hardware gaming controller and the second programmable controller in the second hardware gaming controller; wherein the virtual controller module is configured for operation on any one of the first programmable controller or the second programmable controller.

Example 13 is a method of operating a gaming controller, the gaming controller including a first hardware gaming controller and a second hardware gaming controller each configured to be removably coupleable with a mobile device, the first hardware gaming controller configured to be mechanically secured to a side portion of a housing of a mobile device, and the second hardware gaming controller configured to be mechanically secured to an opposing side portion of the housing of the mobile device, the method including: generating a left controller input with a first programmable controller in the first hardware gaming controller, the first hardware gaming controller configured to be manipulated by a user's left thumb and/or fingers; generating a right controller input with a second programmable controller in the second hardware gaming controller, the second hardware gaming controller configured to be manipulated by a user's right thumb and/or fingers; combining the left controller input and the right controller input to form a virtual gaming controller with a single controller input representation; and providing the virtual gaming controller to a software application operating on a mobile device processor in the mobile device.

In example 14, the subject matter of example 13 can optionally include sending the left controller input and the right controller input separately each through a serial bus connection to the mobile device processor.

In example 15, the subject matter of example 14 can optionally include sending the left controller input to the mobile device processor through a first serial bus connection between the first hardware gaming controller and the mobile device, and sending the right controller input to the mobile device processor through a second serial bus connection between the second hardware gaming controller and the mobile device.

In example 16, the subject matter of example 13 can optionally include sending the left controller input to the mobile device processor through a first wireless data coupling between the first hardware gaming controller and the mobile device, and sending the right controller input to the mobile device processor through a second wireless data coupling between the second hardware gaming controller and the mobile device.

In example 17, the subject matter of example 13 can optionally include sending controller input from the any one of the first hardware gaming controller or the second hardware gaming controller to the corresponding second hardware gaming controller or first hardware gaming controller respectively, through a wireless data coupling.

In example 18, the subject matter of example 17 can optionally include sending the left controller input and the right controller input to the mobile device processor through any one of a serial bus connection or a wireless data coupling between the corresponding second hardware gaming controller or first hardware gaming controller and the mobile device.

In example 19, the subject matter of any one of examples 13 to 18 can optionally include receiving the left controller input and right controller input as distinct data packets, by the mobile device processor.

In example 20, the subject matter of example 19 can optionally include combining the left controller input and the right controller input with the virtual controller module operating on the mobile device processor.

In example 21, the subject matter of example 19 or 20 can optionally include interpreting the distinct data packets with a device driver on the mobile device processor.

In example 22, the subject matter of any one of examples 13 to 21 can optionally include receiving the left controller input and the right controller input in any one of the first hardware gaming controller or the second hardware gaming controller; and combining the left controller input and the right controller input with the virtual controller module operating on any one of the first hardware gaming controller or the second hardware gaming controller.

Example 23 is a mobile device, including: a housing; a mobile device processor in the housing, the mobile device processor coupled to a memory module and configured to run a software application; and a virtual controller module; wherein a side portion of the housing is configured to be removably coupleable to a first hardware gaming controller configured to be manipulated by a user's left thumb and/or fingers to generate a left controller input, wherein an opposing side portion of the housing is configured to be removably coupleable to a second hardware gaming controller configured to be manipulated by a user's right thumb and/or fingers to generate a right controller input; wherein the virtual controller module is configured to combine the left controller input and the right controller input to form a single controller input representation for providing to the software application.

In example 23, the subject matter of example 22 may optionally include that the mobile device processor is configured to receive the left controller input and the right controller input as distinct data packets.

In example 24, the subject matter of example 23 may optionally include that each of the data packets corresponding to the left controller input and the right controller input comprises a respective identifier to identify the corresponding data packet as being from the first hardware gaming controller or the second hardware gaming controller.

In example 25, the subject matter of any one of examples 22 to 24 may optionally include that an operating system running on the mobile device processor is configured to receive the left controller input and the right controller input as distinct data packets; and wherein the virtual controller module is configured for operation on the operating system.

In example 26, the subject matter of example 25 may optionally include that a device driver running on the mobile device processor is configured to receive the left controller input and the right controller input as distinct data packets, for interpreting the data packets for communication with the operating system.

Example 27 is a gaming controller for a mobile device, including: a first hardware gaming controller comprising a first programmable controller and at least one input switch, the at least one input switch of the first hardware gaming controller configured to be manipulated by a user's left thumb and/or fingers to generate a left controller input with the first programmable controller; and a second hardware gaming controller comprising a second programmable controller and at least one input switch, the at least one input switch of the second hardware gaming controller configured to be manipulated by a user's right thumb and/or fingers to generate a right controller input with the second programmable controller; wherein the first hardware gaming controller is configured to be removably coupleable to a side portion of a housing of a mobile device, and the second hardware gaming controller is configured to be removably coupleable to an opposing side portion of the housing of the mobile device, the mobile device configured to run a software application, wherein the left controller input and the right controller input are combinable using a virtual controller module to form a virtual gaming controller with a single controller input representation for providing to the software application.

In example 28, the subject matter of example 27 may optionally include that the first hardware gaming controller comprises a serial bus connection coupling the first programmable controller to the mobile device and the second hardware gaming controller comprises a separate serial bus connection coupling the second programmable controller to the mobile device.

In example 29, the subject matter of any one of examples 27 to 28 may optionally include that the first hardware gaming controller comprises a first wireless transceiver coupled to the first programmable controller and the second hardware gaming controller comprises a second wireless transceiver coupled to the second programmable controller, for establishing a wireless data coupling.

In example 30, the subject matter of any one of examples 27 to 29 may optionally include that the first hardware gaming controller and the second hardware gaming controller are configured to establish separate wireless data couplings to the mobile device.

In example 31, the subject matter of any one of examples 27 to 30 may optionally include that a wireless data coupling is configured to be established between the first programmable controller in the first hardware gaming controller and the second programmable controller in the second hardware gaming controller.

In example 32, the subject matter of any one of examples 27 to 31 may optionally include that any one of the first hardware gaming controller or the second hardware gaming controller comprises a serial bus connection to the mobile device.

In example 33, the subject matter of example 32 may optionally include that any one of the first hardware gaming controller or the second hardware gaming controller further establishes a wireless data coupling to the mobile device.

In example 34, the subject matter of example 33 may optionally include that the wireless data coupling is any one of a Bluetooth connection, a Wireless Universal Serial Bus (WUSB) connection, a radio frequency connection, or an infrared data connection.

In example 35, the subject matter of any one of examples 27 to 34 may optionally include a data coupling between the first programmable controller in the first hardware gaming controller and the second programmable controller in the second hardware gaming controller; wherein the virtual controller module is configured for operation on any one of the first programmable controller or the second programmable controller.

In example 36, the subject matter of any one of examples 27 to 35 may optionally include that the left controller input and the right controller input are distinct data packets.

In example 37, the subject matter of example 36 may optionally include that each of the data packets corresponding to the left controller input and the right controller input comprises a respective identifier to identify the corresponding data packet as being from the first hardware gaming controller or the second hardware gaming controller.

In example 38, the subject matter of any one of examples 27 to 37 may optionally include that each of the first hardware gaming controller and the second hardware gaming controller is mechanically securable to a respective side portion of the housing of the mobile device.

Example 39 is a non-transitory computer-readable medium including instructions which, when executed by a processor, causes the processor to perform a method of operating a gaming controller, the method including: receiving a left controller input generated by a first programmable controller in a first hardware gaming controller through a data coupling between the first hardware gaming controller and the mobile device, the first hardware gaming controller configured to be manipulated by a user's left thumb and/or fingers; receiving a right controller input with a second programmable controller in a second hardware gaming controller through a data coupling between the first hardware gaming controller and the mobile device, the second hardware gaming controller configured to be manipulated by a user's right thumb and/or fingers; combining the left controller input and the right controller input to form a single controller input representation; and providing the single controller input representation to a software application operating on a mobile device processor in the mobile device.

In example 40, the subject matter of example 39 may optionally include that the method further includes: receiving the left controller input and right controller input as distinct data packets, by the mobile device processor in the mobile device.

In example 41, the subject matter of example 40 may optionally include that each of the data packets corresponding to the left controller input and the right controller input comprises a respective identifier to identify the corresponding data packet as being from the first hardware gaming controller or the second hardware gaming controller.

The above apparatus, method and/or system as described and illustrated in the corresponding figures, is not intended to limit an or any apparatus, method or system as according to an embodiment, and the scope of the present disclosure. The description further includes, either explicitly or implicitly, various features and advantages of the method or system according to the present disclosure, which can be encompassed within an apparatus, method or system according to the disclosure.

While embodiments of the disclosure have been particularly shown and described with reference to specific embodiments, it should be understood by those skilled in the art that various changes in form and detail may be made therein without departing from the spirit and scope of the disclosure as defined by the appended claims. The scope of the disclosure is thus indicated by the appended claims and all changes which come within the meaning and range of equivalency of the claims are therefore intended to be embraced.

The invention claimed is:

1. A gaming controller for a mobile device, comprising:
a hardware gaming controller comprising a button operable by a user to generate a controller input, the hardware gaming controller mechanically securable to a side portion of a housing, wherein the hardware gaming controller comprises a coupling member shaped to engage the side portion of the housing, the coupling member comprising a raised edge that fits around the side portion of the housing.

2. The gaming controller of claim 1, wherein the housing is a housing of the mobile device.

3. The gaming controller of claim 1, wherein the coupling member comprises an elongate member shaped to fit the side portion of the housing.

4. The gaming controller of claim 1 further comprising:
a vibration module to provide vibration feedback for the user.

5. The gaming controller of claim 3, wherein the button is provided on a controller surface of the hardware gaming controller, wherein the elongate member extends out of an elongate surface of the hardware gaming controller, the elongate surface being at least substantially perpendicular to the control surface of the hardware gaming controller.

6. The gaming controller of claim 5, wherein the raised edge extends perpendicularly out of the elongate surface.

7. The gaming controller of claim 1, wherein the controller input is sent to the mobile device for use in an application, and the application sends information to the gaming controller related to actions in the application.

8. The gaming controller of claim 1, wherein the hardware gaming controller comprises a transceiver configured to establishing wireless data coupling with the mobile device.

9. The gaming controller of claim 1, wherein the hardware gaming controller comprises communication pins disposed on the coupling member, for facilitating wired communication with the mobile device.

10. The gaming controller of claim 9, wherein the housing comprises electrical contacts configured to couple with the communication pins.

11. The gaming controller of claim 1, further comprising:
a further hardware gaming controller comprising a further button operable by the user to generate a further controller input, the further hardware gaming controller mechanically securable to a further side portion of the housing.

12. The gaming controller of claim 11, wherein the hardware gaming controller is configured to be manipulated by the user's left hand such that the controller input is a left controller input, wherein the further hardware gaming controller is configured to be manipulated by the user's right hand such that the further controller input is a right controller input.

13. The gaming controller of claim 12, wherein the hardware gaming controller operates as a primary game controller to combine the left controller input and the right controller input into a single controller input representation for providing to the mobile device.

14. The gaming controller of claim 12, wherein the left controller input and the right controller input are distinct data packets.

15. The gaming controller of claim 11 further comprising:
one or more shoulder buttons at an edge of each of the hardware gaming controller and the further hardware gaming controller.

16. The gaming controller of claim 11, wherein one of the hardware gaming controller and the further hardware gaming controller is a primary game controller configured to combine the controller input and the further controller input into a single controller input representation for providing to the mobile device, and wherein the other hardware gaming controller is a secondary game controller.

17. The gaming controller of claim 16, wherein the primary game controller is configured to transmit the single controller input representation to the mobile device via a first protocol and further configured to receive an input of the secondary game controller via a second protocol.

18. The gaming controller of claim 15, wherein the shoulder buttons are arranged to be operable by an index finger of the user.

19. The gaming controller of claim 11, wherein the hardware gaming controller and the further hardware gaming controller are provided as a singular gaming controller peripheral, physically connected by a receiving plate, arranged to receive a mobile device.

20. The gaming controller of claim 11 being magnetically secured to the mobile device.

* * * * *